(12) United States Patent
Fujikawa et al.

(10) Patent No.: US 9,415,805 B2
(45) Date of Patent: Aug. 16, 2016

(54) FRONT VEHICLE BODY STRUCTURE

(71) Applicant: Nissan Motor Co., Ltd., Kanagawa (JP)

(72) Inventors: Kazutoyo Fujikawa, Kanagawa (JP); Takamasa Ono, Kanagawa (JP); Hajime Kumamaru, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/782,336

(22) PCT Filed: Mar. 20, 2014

(86) PCT No.: PCT/JP2014/057663
§ 371 (c)(1),
(2) Date: Oct. 5, 2015

(87) PCT Pub. No.: WO2014/162880
PCT Pub. Date: Oct. 9, 2014

(65) Prior Publication Data
US 2016/0023681 A1     Jan. 28, 2016

(30) Foreign Application Priority Data

Apr. 5, 2013  (JP) ................................. 2013-079151
Aug. 23, 2013 (JP) ................................. 2013-173402

(51) Int. Cl.
*B62D 21/15*  (2006.01)
*B62D 25/08*  (2006.01)

(52) U.S. Cl.
CPC ............ *B62D 21/152* (2013.01); *B62D 25/082* (2013.01)

(58) Field of Classification Search
CPC ..... B62D 21/15; B62D 21/152; B62D 21/157
See application file for complete search history.

(56) References Cited

U.S. PATENT DOCUMENTS 8,985,258 B1 *  3/2015  Midoun .............. B62D 25/082
                                                        180/274
2004/0195862 A1  10/2004  Saeki
(Continued)

FOREIGN PATENT DOCUMENTS

JP    2002-321643 A    11/2002
JP    2003-226266 A     8/2003
(Continued)

OTHER PUBLICATIONS

International Preliminary Report on Patentability issued in corresponding PCT Application No. PCT/JP2014/057663, mailed on Jan. 16, 2015 (12 pages).

*Primary Examiner* — Ruth Ilan
(74) *Attorney, Agent, or Firm* — Osha Liang LLP

(57) ABSTRACT

A front vehicle body structure has a member provided at a side section of a vehicle body along a vehicle-body front-rear direction, a powertrain disposed on an inner side of the vehicle body relative to the member and fixed to a front section of the vehicle body, and a load transmission member provided on the member and configured to come into contact with one end portion, in a vehicle width direction, of the powertrain when receiving a collision load applied by an obstacle from a front side of the vehicle body, and to transmit the load from the obstacle to the powertrain in a state of being sandwiched between the obstacle and the powertrain. The load transmission member has a concave curved surface formed in a surface thereof along the vehicle-body front-rear direction. The concave curved surface is elastically deformed in the state of being sandwiched between the obstacle and the powertrain and receiving the load.

10 Claims, 23 Drawing Sheets

(56) References Cited

U.S. PATENT DOCUMENTS

| | | |
|---|---|---|
| 2004/0200659 A1 | 10/2004 | Miyasaka |
| 2010/0127531 A1* | 5/2010 | Yasuhara ............ B62D 21/152 296/187.09 |
| 2012/0248820 A1 | 10/2012 | Yasui et al. |
| 2013/0257028 A1* | 10/2013 | Kuwabara ............ B62D 21/155 280/784 |
| 2015/0298742 A1* | 10/2015 | Ono ....................... B62D 21/11 296/187.09 |
| 2015/0314742 A1* | 11/2015 | Kato .................... B62D 21/152 293/155 |
| 2015/0344073 A1* | 12/2015 | Midoun ............... B62D 21/152 296/187.1 |
| 2016/0046326 A1* | 2/2016 | Jung .................... B62D 25/082 180/312 |

FOREIGN PATENT DOCUMENTS

| | | |
|---|---|---|
| JP | 4122887 B2 | 7/2008 |
| JP | 2008-213739 A | 9/2008 |
| JP | 2012-214211 A | 11/2012 |
| JP | 2012-228906 A | 11/2012 |

* cited by examiner

FRONT VEHICLE BODY STRUCTURE

BACKGROUND

1. Technical Field

The present invention relates to a front vehicle body structure.

2. Related Art

A technique described in Japanese Patent Unexamined Publication No. 2008-213739 has heretofore been known as a measure for small overlap collision. The small overlap collision refers to a collision in which an obstacle collides with a vehicle body from the front side of the vehicle body at a position outward, in the vehicle width direction, from a side member provided at a side section of the vehicle body along the front-rear direction.

In the technique described in Japanese Patent Unexamined Publication No. 2008-213739, a bumper reinforcement is provided at the front end of the side member, the bumper reinforcement being provided along the vehicle width direction. Further, a reinforcement extension is provided to extend rearward from an outer end portion of the bumper reinforcement in the vehicle width direction. The reinforcement extension includes a protruding section formed to protrude toward the side member. At the time of the small overlap collision, the protruding section comes into contact with the side member to exert a resistive force. Moreover, at the moment of the contact, the protruding section is received by a stopper bracket provided on the side member so that the side member can be prevented from being displaced rearward.

SUMMARY

Meanwhile, the conventional front vehicle body structure may undergo, for example, full overlap collision or the like in which a collision load is exerted on each side member from the front side of the vehicle body. In this case, the reinforcement extension, which is disposed along the side member, interferes and makes it difficult for the side member to be crushed. Consequently, the amount of deformation of the side member is reduced, and the impact absorption performance may possibly be lowered.

A front vehicle body structure according to one or more embodiments of the present invention has enhanced performance of absorbing collision load from the front side of the vehicle.

A front vehicle body structure according to one or more embodiments of the present invention includes: a member provided at a side section of a vehicle body along a vehicle-body front-rear direction; and a powertrain disposed on an inner side of the vehicle body relative to the member. The front vehicle body structure further includes a load transmission member provided on the member and configured to come into contact with one end portion, in a vehicle width direction, of the powertrain when receiving a collision load applied by an obstacle from a front side of the vehicle body, and to transmit the collision load to the powertrain in a state of being sandwiched between the obstacle and the powertrain.

DETAILED DESCRIPTION

Figure 1:
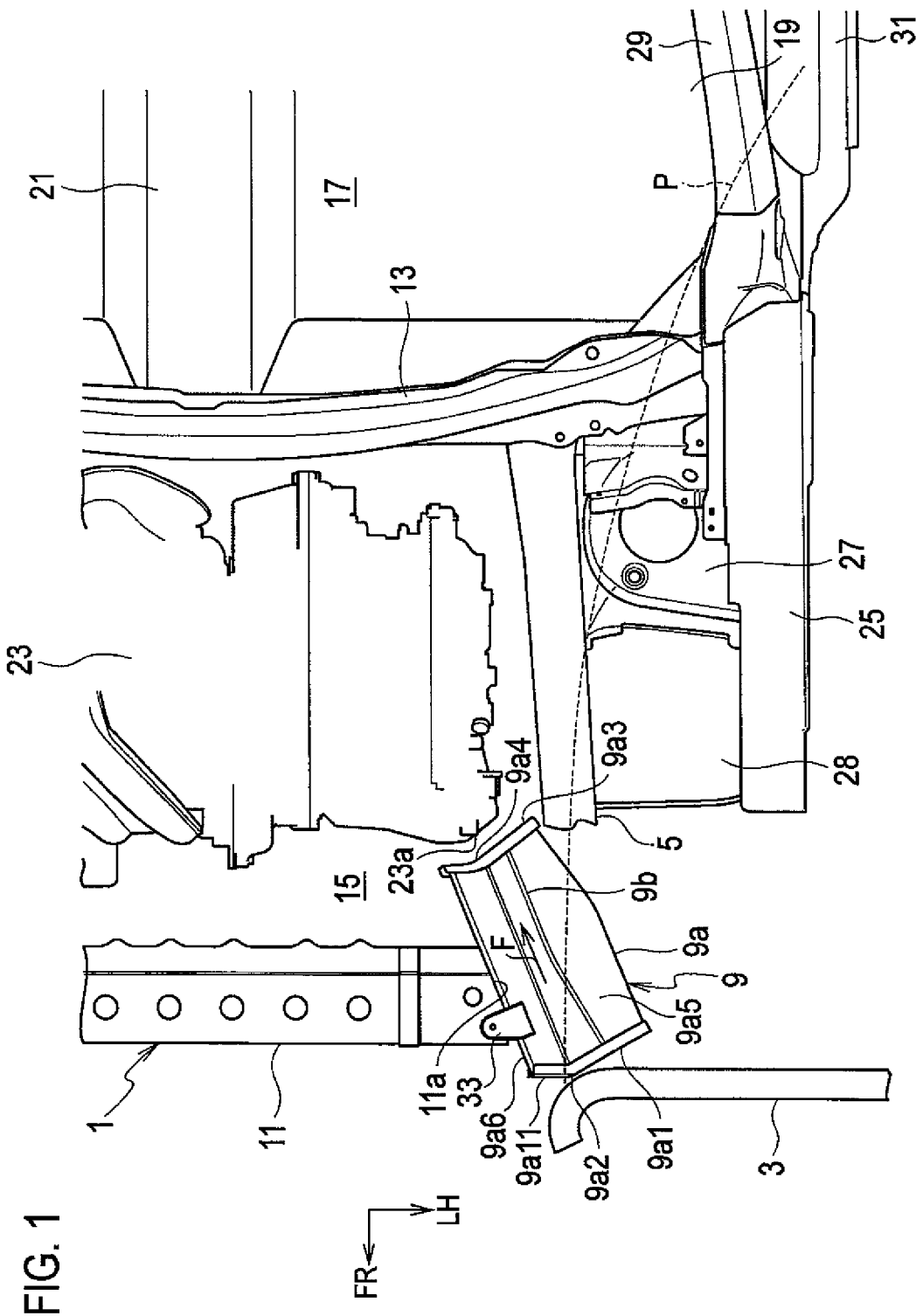
FIG. 1 is a plan view of a left portion of a front section of a vehicle body showing a front vehicle body structure according to a first embodiment.

Embodiments of the present invention will now be described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Note that the dimensional proportions in the drawings may be exaggerated for convenience and may differ from the actual proportions.

First Embodiment

FIG. 1 shows a front vehicle body structure according to a first embodiment of the present invention. FIG. 1 shows the initial state of collision of a left front section of a vehicle body 1 with an obstacle 3. Note that in the drawings, the direction shown by arrow FR is the front side of the vehicle body and the direction shown by arrow LH is the left side of the vehicle body.

Figure 2:
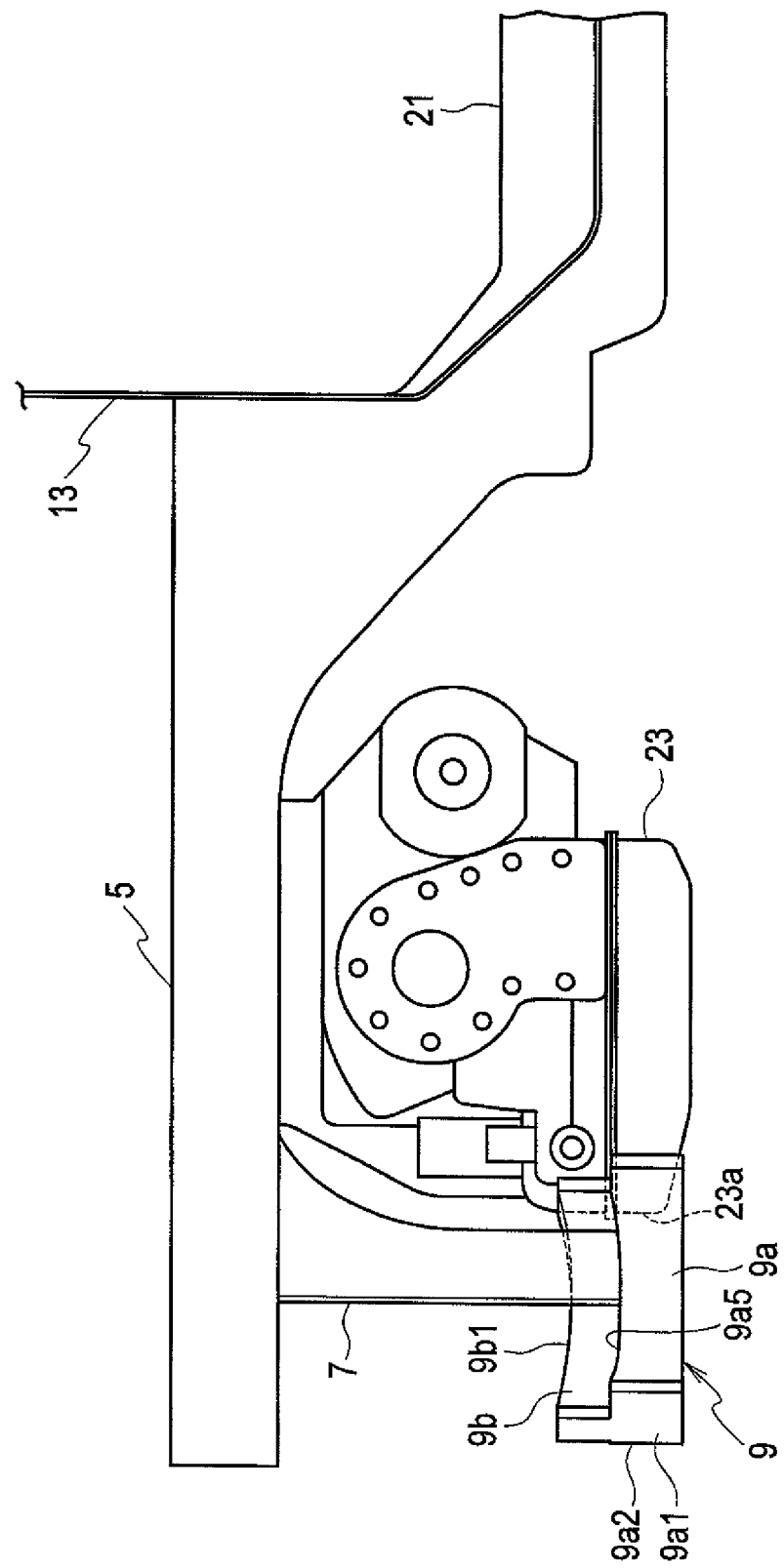
FIG. 2 is a side view showing the front vehicle body structure in FIG. 1.
Figure 3:
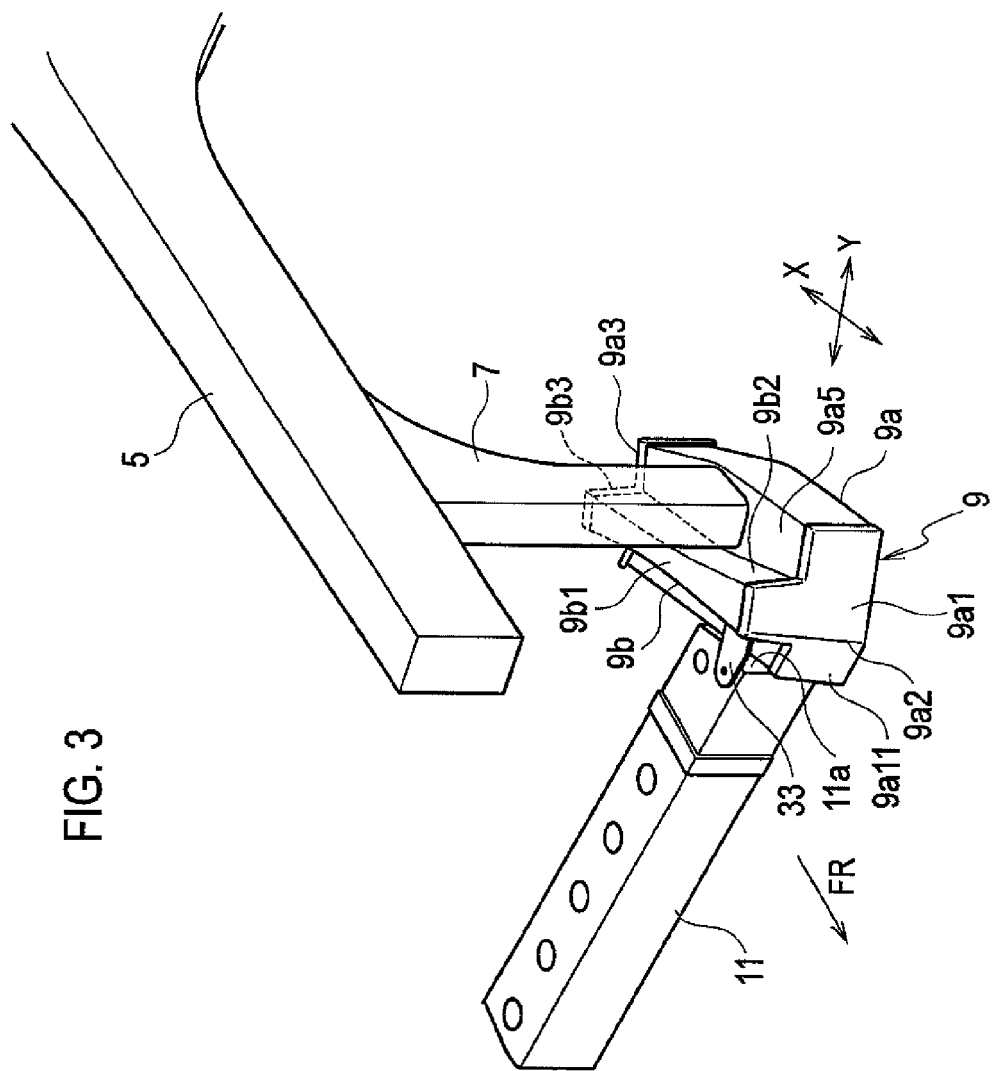
FIG. 3 is a perspective view showing a main section of the front vehicle body structure in FIG. 1.

A pair of front side members 5 as side members is provided along the vehicle-body front-rear direction (left-right direction in FIG. 1) at the opposite sections of the vehicle body 1 in the vehicle width direction. As shown in FIGS. 2 and 3, at a lower portion of each front side member 5 around the front side of the vehicle body, the upper end of a coupling member 7 provided along the vertical direction (the direction perpendicular to the plane of the sheet of FIG. 2) is coupled. Further, the lower end of the coupling member 7 is coupled to an upper portion of a load transmission member 9. Also, the load transmission member 9 is coupled to an end portion, in the vehicle width direction, of a cross member 11 provided along the vehicle width direction. Details of the shape of the load transmission member 9 will be described later.

As shown in FIG. 1, a dash panel 13 is disposed on the rear side of the vehicle body relative to the cross member 11. Relative to the dash panel 13, an engine compartment 15 is formed on the front side of the vehicle body and a cabin 17 is formed on the rear side of the vehicle body. The cabin 17 includes a floor panel 19 at the bottom. At the center of the floor panel 19 in the vehicle width direction, a center tunnel section 21 is formed which is provided along the vehicle-body front-rear direction and protrudes toward the upper side of the vehicle body (toward the front surface of the sheet of FIG. 1).

The engine compartment 15 is an area surrounded by the left and right front side members 5, the cross member 11, and the dash panel 13, and a powertrain 23 which includes an engine and a transmission is disposed in this area. Moreover, the powertrain 23 is mounted to the left and right front side members 5 through mount brackets not shown.

A hood ridge panel 25 is provided outward, in the vehicle width direction, from each front side member 5 in the engine compartment 15. Moreover, a strut tower 27 is provided inward from the hood ridge panel 25 in the vehicle width direction near the dash panel 13. A hood ridge lower front section 28 is formed on a front lower side of the strut tower 27. Also, a front pillar 29 is located on the rear side of the vehicle relative to the hood ridge panel 25. Further, the front end of a side sill 31 which is provided along the vehicle-body front-rear direction is coupled to the lower end of the front pillar 29.

As shown in FIG. 3, the load transmission member 9 includes: a base section 9a which has a flat and substantially cuboidal shape and a protruding section 9b which has a long and substantially cuboidal shape and protrudes upward from the top of the base section 9a. Here, as for the load transmission member 9 in FIG. 3, its longitudinal direction in a plan view seen in the vertical direction of the vehicle body will be referred to as the X direction, and a direction perpendicular to the X direction will be referred to as the Y direction.

The protruding section 9b is provided along the X direction substantially on the center of the base section 9a in the Y direction. A front end surface 9a1 of the base section 9a on the front side of the vehicle body is such that its inner side in the vehicle width direction is bent at a bent portion 9a2 toward the rear side of the vehicle body, thereby forming a bent surface 9a11. Also, the bent portion 9a2 is located to substantially coincide with the inner edge of the protruding section 9b in the vehicle width direction. As a result, the front end surface 9a1 is in a shape protruding toward the front side of the vehicle body. Likewise, as shown in FIG. 1, a rear end surface 9a3 of the base section 9a on the rear side of the vehicle body is such that its inner side in the vehicle width direction is bent at a bent portion 9a4 toward the rear side of the vehicle body. Also, the bent portion 9a4 is located to coincide with the inner edge of the protruding section 9b in the vehicle width direction. As a result, the rear end surface 9a3 is in a shape recessed toward the front side of the vehicle body.

As shown in FIGS. 2 and 3, an upper surface 9b1 of the protruding section 9b is formed as a concave curved surface, and a side surface 9b2 of the protruding section 9b on the outer side in the vehicle width direction is also formed as a concave curved surface. Moreover, an upper surface 9a5 of the base section 9a located on the outer side in the vehicle width direction is also formed as an concave curved surface like the upper surface 9b1 of the protruding section 9b. In sum, in the first embodiment, concave curved surfaces are formed in the surface of the load transmission member 9 along the vehicle-body front-rear direction.

As shown in FIG. 1, while attached to the front side member 5 and the coupling member 7, this load transmission member 9 as a whole is such that a section thereof on the front side of the vehicle body is located outward from a section thereof on the rear side of the vehicle body in the vehicle width direction. In order words, the load transmission member 9 is inclined in the vehicle-body left-right direction with respect to the vehicle-body front-rear direction.

Here, while the load transmission member 9 is attached to the vehicle body 1, a side surface 9a6 of the base section 9a on the inner side in the vehicle width direction, on the front side of the vehicle body, is in contact with and fixed to an end portion in the vehicle width direction 11a of the cross member 11 through an attachment 33. On the other hand, the lower end of the coupling member 7 shown in FIGS. 2 and 3 is fixed substantially to the center, in the X direction, of the upper surface 9a5 of the base section 9a on the outer side in the vehicle width direction. Thus, the load transmission member 9 is provided between the front side member 5 and the cross member 11.

Moreover, as shown in FIG. 1, the rear end surface 9a3 of the base section 9a and a rear end surface 9b3 of the protruding section 9b on the rear side of the vehicle body face a corner portion 23a of the powertrain 23 located at a front section thereof on the outer side in the vehicle width direction. Also, while the load transmission member 9 is attached as described above, the rear end surface 9a3 and the rear end surface 9b3 are spaced away from the corner portion 23a by a certain distance.

Description will now be given of the path of transmission of a collision load applied when a vehicle including the above-described front vehicle body structure collides from the front side with the obstacle 3 such as another automobile, as shown in FIG. 1. Note that the collision here is assumed to be collision of the obstacle 3 with a spot around the front side member 5 on the left side in the vehicle width direction. This collision with the spot around the front side member 5 includes small overlap collision in which the obstacle collides at a position outward from the front side member 5 in the vehicle width direction.

Figure 4:
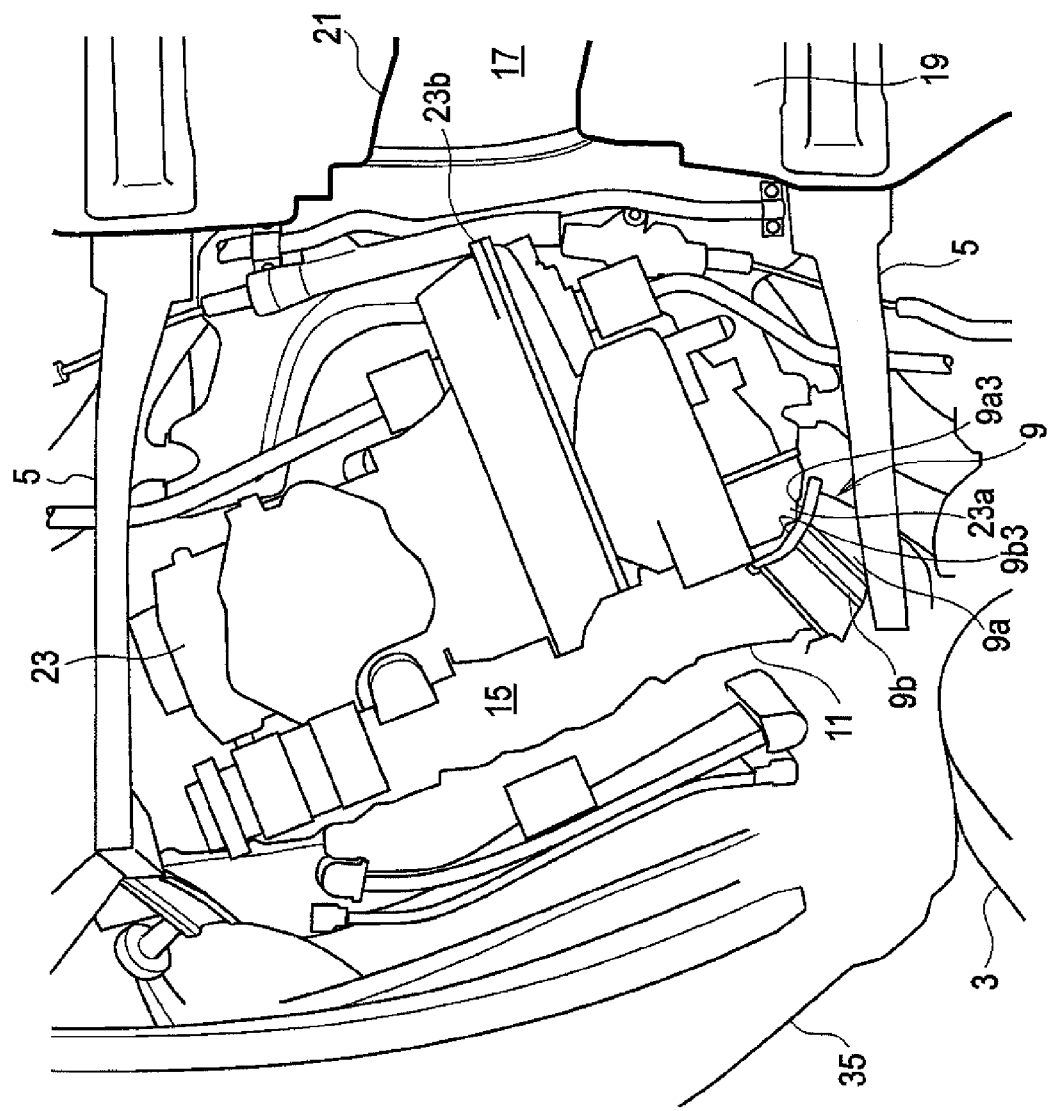
FIG. 4 is an explanatory view of the operation of the front vehicle body structure in FIG. 1 showing how the vehicle body is deformed in a small overlap collision.

In the small overlap collision, when the obstacle 3 reaches the load transmission member 9 through a front bumper 35 shown in FIG. 4, the load transmission member 9 is moved toward the rear side of the vehicle body along with the cross member 11 and the coupling member 7, which are attached to the load transmission member 9. By this movement, the rear end surfaces 9a3, 9b3 on the rear side of the load transmission member 9 come into contact with the corner portion 23a of the powertrain 23, which is located at the front section thereof on the outer side in the vehicle width direction, and thereby transmit the collision load thereto. The direction of this load transmission is the direction of arrow F in FIG. 1 which corresponds to the longitudinal direction of the load transmission member 9. Here, the front side member 5 is formed to be more fragile at a section thereof on the front side of the vehicle body relative to the coupling member 7 than a section thereof on the rear side of the vehicle relative to the coupling member 7. Hence, the fragile front section is crushed.

Moreover, since the direction of the load transmission is the direction of arrow F during the above-mentioned movement, the load transmission member 9 and the powertrain 23 turn counterclockwise in FIGS. 1 and 4 with the load transmission member 9 sandwiched between the obstacle 3 and the powertrain 23. Here, the load transmission member 9 and the powertrain 23 turn while maintaining substantially the same relative positions with each other. Note that the upper surface 9b1 and the side surface 9b2 on the outer side in the vehicle width direction of the protruding section 9b of the load transmission member 9 as well as the upper surface 9a5 of the load transmission member 9 are formed as concave curved surfaces. Thus, when the load is transmitted, these curved surfaces are elastically deformed to be curved further, which reduces the likelihood of fracture of the load transmission member 9. Hence, the load transmission can be done efficiently.

As shown in FIG. 4, the powertrain 23, which turns as described above, turns counterclockwise about a fulcrum around a portion thereof mounted to the front side member 5 at an end portion on the right side in the vehicle width direction (upper side in FIG. 4). In this turn, the powertrain 23 transmits the load thereto such that a rear portion 23b on the left side in the vehicle width direction comes into contact with around the center tunnel section 21 of the floor panel 19. A stiffness of the center tunnel section 21 is higher than other flat portions of the floor panel 19 on which the occupants place their feet. Thus, the turn of the powertrain 23 can be stopped by the center tunnel section 21 at an earlier stage and the deformation of the cabin 17 can therefore be reduced to be smaller. Note that a section of the cabin 17 located on the lower side of the vehicle body relative to the dash panel 13 shown in FIG. 1 is shown, and the dash panel 13 is therefore not shown in FIG. 4.

Moreover, using the inertia force of the powertrain 23 generated by its turn, the whole vehicle body moves laterally toward the right side in the vehicle width direction (upper side in FIG. 4) so as to bring the obstacle 3 away from the front pillar 29. As a result, the deformation of the cabin 17 by the obstacle 3 is reduced. Meanwhile, broken line P in FIG. 1 is the trajectory of the obstacle 3 after the collision. As the vehicle body 1 (front pillar 29) moves laterally toward the upper side in FIG. 4, the obstacle 3 moves in the direction opposite to this lateral movement, which is toward the lower side in FIG. 4. By the above-described features, the front vehicle body structure of the first embodiment can achieve enhanced performance of absorbing collision load from the front side of the vehicle.

As mentioned above, the load transmission member 9 is disposed between the front side member 5 and the cross member 11. Moreover, the end portion of the load transmission member 9 on the rear side of the vehicle body protrudes only slightly into the engine compartment 15. Hence, flexibility is ensured for the layout of components inside the engine compartment 15.

Also, in the first embodiment, the load transmission member 9 is elastically deformed in the state of being sandwiched between the obstacle 3 and the powertrain 23 and receiving a load, which reduces the likelihood of fracture of the load transmission member 9. Hence, the load transmission to the powertrain 23 can be done efficiently.

Here, in the first embodiment, the load transmission member 9 has concave curved surfaces formed in the surface (the upper surface 9b1, the side surface 9b2, and the upper surface 9a5) thereof along the vehicle-body front-rear direction. Also, the concave curved surfaces are elastically deformed to be curved further in the state of receiving the load, which further reduces the likelihood of fracture of the load transmission member 9. Hence, the load transmission to the powertrain 23 can be done more efficiently.

Note that the shape of the rear end surfaces 9a3, 9b3, which are the portions of the load transmission member 9 at which it comes into contact with the powertrain 23, is one important feature for the load transmission member 9 to remain sandwiched between the powertrain 23 and the obstacle 3 after coming into contact with the powertrain 23.

For this reason, in the first embodiment, the rear end surface 9a3 is bent at the bent portion 9a4 to have a shape recessed toward the front side of the vehicle body. In this way, this recessed portion can receive the corner portion 23a of the powertrain 23 and ensure the load transmission member 9 to remain sandwiched between the powertrain 23 and the obstacle 3. In this case, the shape of the rear end surfaces 9a3, 9b3 of the load transmission member 9 is designed in conformity with the shape of the corner portion 23a, which is the portion of the powertrain 23 where it comes into contact with the load transmission member 9. With this shape, the load transmission member 9 can remain sandwiched between the powertrain 23 and the obstacle 3.

Figure 5:
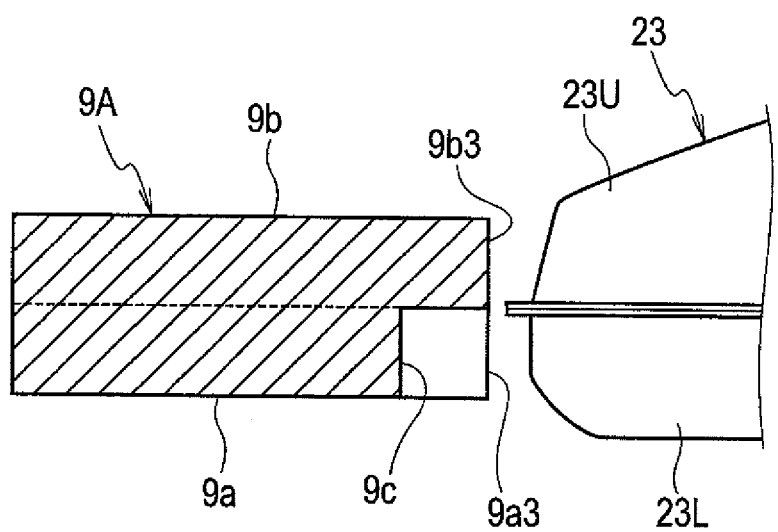
FIG. 5 is a side view showing another example of a load transmission member along with a powertrain.

Alternatively, a shape as shown in FIG. 5 may be employed as another example. Specifically, the rear end surface 9a3 of a load transmission member 9A on the side where it comes into contact with the powertrain 23 may have a shape that accommodates the difference in strength (material) between an upper section 23U and a lower section 23L of a housing of the powertrain 23.

In this case, as shown in FIG. 5, the housing of the powertrain 23 includes the upper section 23U made of an aluminum alloy and the lower section 23L serving as an oil pan made of iron higher in stiffness than the upper section 23U. Here, when the load transmission member 9 comes into contact with the powertrain 23 as shown in FIG. 4, the upper section 23U and the lower section 23L are located to coincide with the protruding section 9b and the base section 9a, respectively.

Also, a recessed section 9c to enter for the lower section 23L with higher stiffness is provided in the rear end surface 9a3 of the base section 9a which is located to coincide with the lower section 23L. The recessed section 9c is formed at a position which is substantially at the center in the Y direction and substantially under the protruding section 9b. When the load transmission member 9 comes into contact with the powertrain 23 as shown in FIG. 4, the upper section 23U with lower rigidity is crushed rearward to the position of a two-dot chain line shown in FIG. 5 whereas the lower section 23L with higher rigidity enters the recessed section 9c of the load transmission member 9 since it is harder to crush. Note that the load transmission member 9 is made of iron like the lower section 23L.

In this way, it is easier for the load transmission member 9 to remain sandwiched between the obstacle 3 and the powertrain 23 after coming into contact with the powertrain 23. Hence, the load transmission by the following turning movement can be done efficiently.

Using FIGS. 6 to 8, description will now be given of full overlap collision in which substantially the entire area of the vehicle body 1 in the vehicle width direction collides with an obstacle 3A such as another automobile, or moderate overlap collision in which the obstacle 3A collides at a position that covers at least one of the left and right front side members 5.

In this case, the obstacle 3A comes into contact with the load transmission member 9 at a contact portion Q through the front bumper not shown. This contact portion Q corresponds to the bent surface 9a11 located inward from the bent portion 9a2 in the vehicle width direction. Further, the contact portion Q is located outward, in the vehicle width direction, from the corner portion 23a of the powertrain 23, at which it comes into contact with the load transmission member 9. In other words, in the first embodiment, the contact portion Q of the load transmission member 9 on the front side of the vehicle body which comes into contact with the obstacle 3A is located outward, in the vehicle width direction, from a contact portion R of the load transmission member 9 on the rear side of the vehicle body which comes into contact with the powertrain 23. Also, the direction of the load transmission during the contact mentioned above is the direction of arrow F which is substantially in parallel with the vehicle-body front-rear direction.

Figure 6:
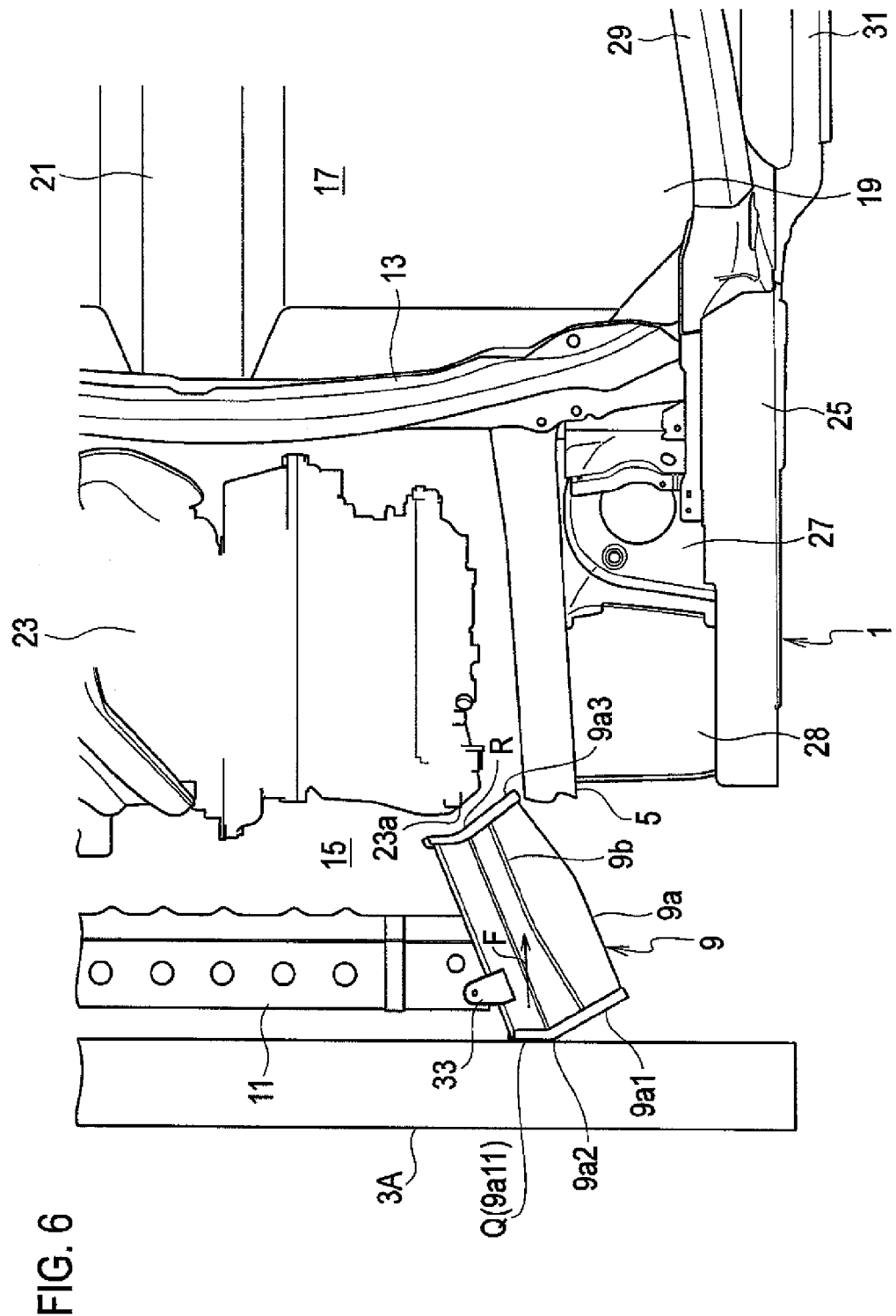
FIG. 6 is a view for explaining the operation of the front vehicle body structure in FIG. 1 at the initial stage of a full overlap collision.
Figure 7:
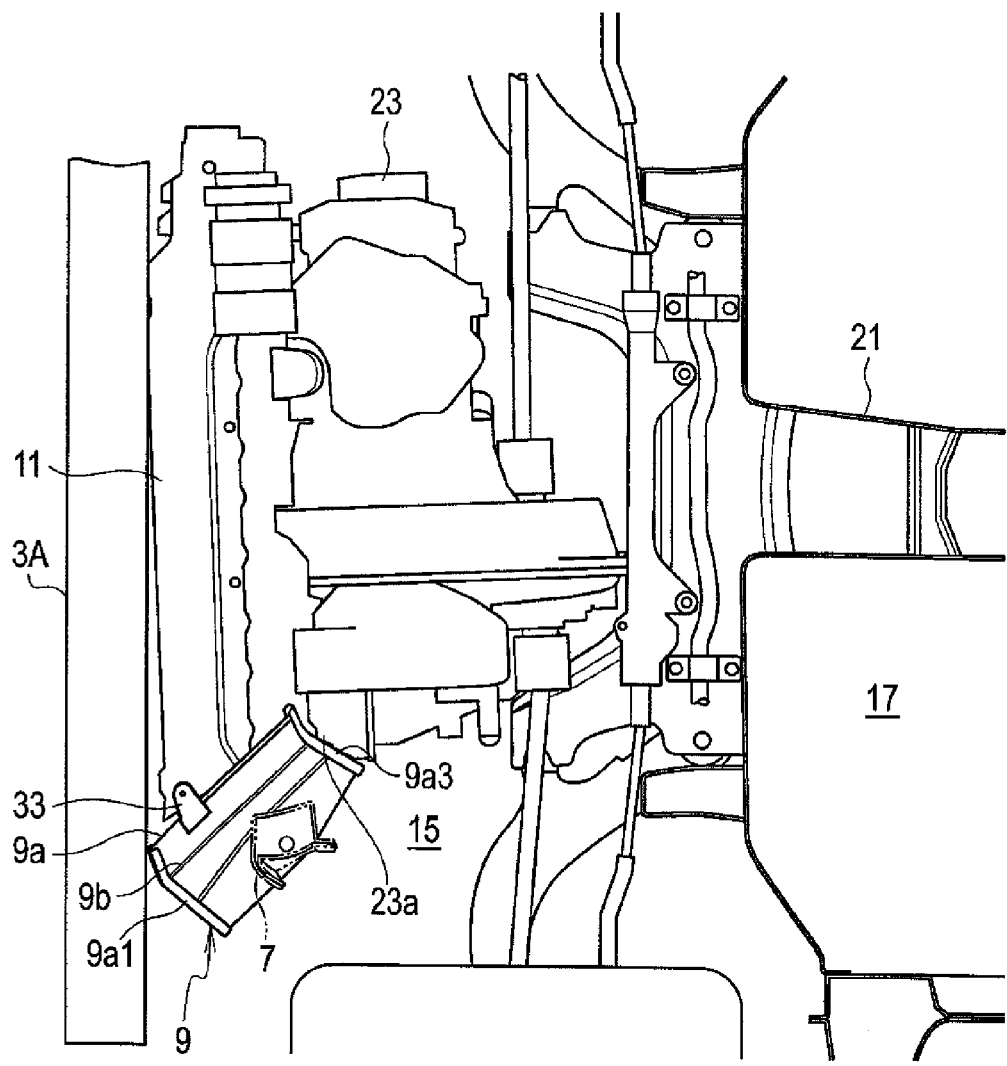
FIG. 7 is an explanatory view of the operation following FIG. 6.
Figure 8:
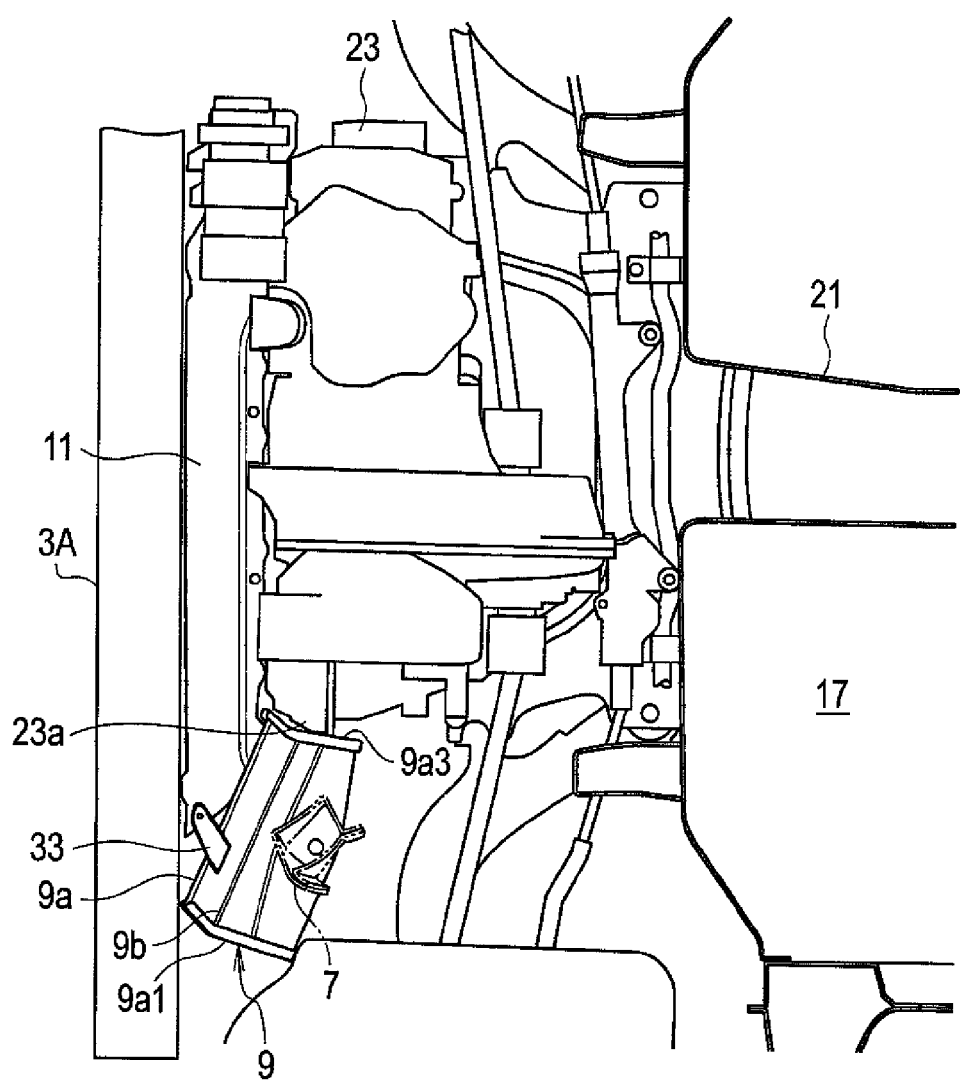
FIG. 8 is an explanatory view of the operation following FIG. 7.

For this reason, after coming into contact at the contact portion Q with the powertrain 23 as shown in FIG. 6, the load transmission member 9 comes into contact at the rear end surface 9a3 with the corner portion 23a of the powertrain 23 as shown in FIG. 7. Then, the whole powertrain 23 turns counterclockwise in FIG. 7 about the contact portion R. Thereafter, as shown in FIG. 8, the load transmission member 9 moves such that the X direction (longitudinal direction) is substantially in parallel with the vehicle width direction with the front end surface 9a1 located on the outer side in the vehicle width direction and the rear end surface 9a3 located on the inner side in the vehicle width direction. In this case, the load transmission member 9 starts turning at an earlier stage than it does in the small overlap collision in FIGS. 1 and 4, so that the load transmission from the load transmission member 9 to the powertrain 23 is stopped at an earlier stage. Hence, the deformation of the cabin 17 by the powertrain 23 can be reduced.

Also, in this case, since the load transmission member 9 starts turning at an earlier stage as mentioned above, it is accordingly easier for the front side member 5 to be crushed. As a result, the front side member 5 is deformed by a sufficient amount. Hence, the impact absorption performance can be enhanced.

As described above, the front vehicle body structure according to the first embodiment includes: a member provided at the side section of the vehicle body along the vehicle-body front-rear direction; and the powertrain 23 disposed on the inner side of the vehicle body relative to the member and fixed to the front section of the vehicle body. The front vehicle body structure further includes the load transmission member provided on the member and configured to come into contact with one end portion, in the vehicle width direction, of the powertrain when receiving a collision load applied by an obstacle from the front side of the vehicle body, and to transmit the load to the powertrain in the state of being sandwiched between the obstacle and the powertrain.

Also, the front vehicle body structure according to the first embodiment further includes the cross member 11 provided along the vehicle width direction. Moreover, in the first embodiment, the member is a pair of left and right side members provided at the respective side sections of the vehicle body along the vehicle-body front-rear direction, and the cross member 11 couples the pair of left and right side members to each other. Furthermore, the load transmission member 9 is provided between each of the side members and the cross member and transmits the collision load to the powertrain 23 while turning along with the powertrain in the state of being sandwiched between the obstacle 3 and the powertrain. In this way, the collision load received by the load transmission member is efficiently transmitted to the vehicle body through the powertrain. Hence, the performance of absorbing collision load from the front side of the vehicle body can be enhanced.

While a first embodiment is described above as an example, the present invention is not limited to the first embodiment. For example, the load transmission member 9 is coupled to the end portion 11a of the cross member 11 in the vehicle width direction in the first embodiment, but the load transmission member 9 can be coupled to the upper surface of the cross member 11. In other words, in this case, the load transmission member 9 is coupled to the cross member 11 and the coupling member 7 in such a way as to be sandwiched between the cross member 11 on the lower side and the coupling member 7 on the upper side. Such a coupled state can also achieve similar advantageous effects. Note that although the left side of the vehicle body is described in the first embodiment, the load transmission member is also provided similarly on the right side of the vehicle body.

Second Embodiment

A front vehicle body structure according to a second embodiment of the present invention will be described with reference to FIGS. 9 to 25. Note that in the drawings, the direction shown by arrow FR is the front side of the vehicle body and the direction shown by arrow RR is the rear side of the vehicle body. Also, the direction shown by arrow RH is the right side of the vehicle body and the direction shown by arrow LH is the left side of the vehicle body.

Figure 9:
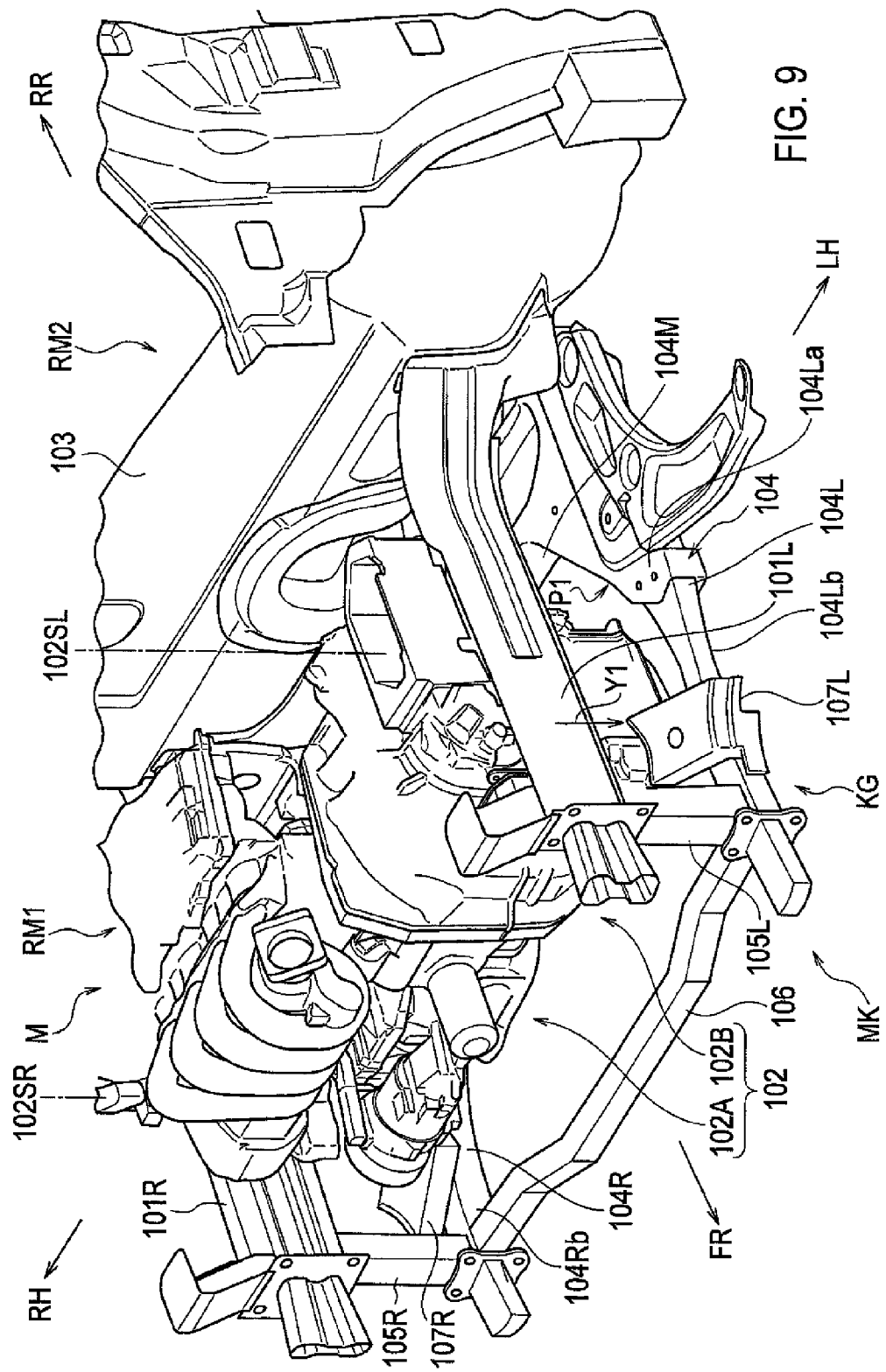
FIG. 9 is a perspective view for explaining a front vehicle body structure according to a second embodiment.
Figure 10:
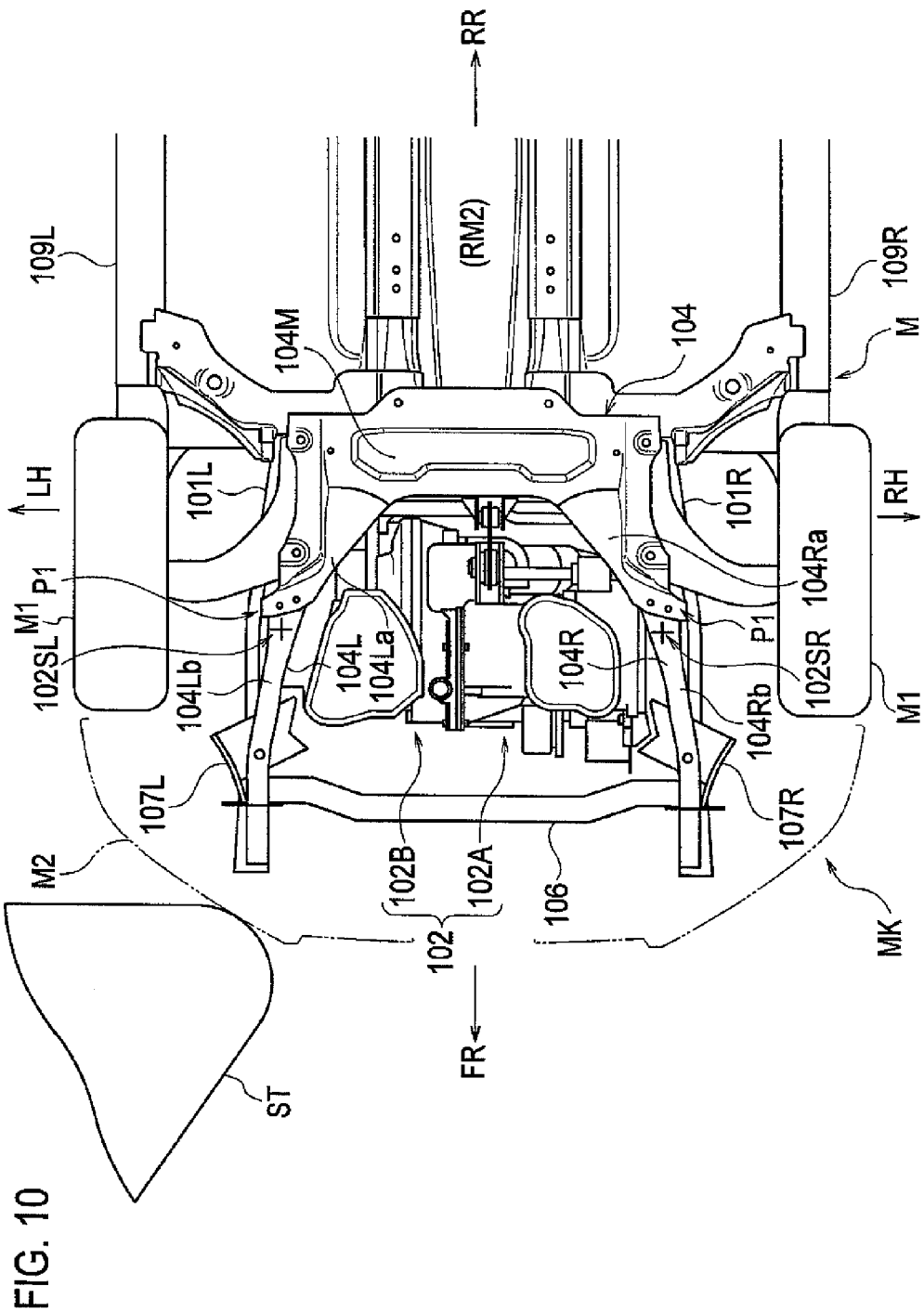
FIG. 10 is a bottom view for explaining the front vehicle body structure.

First, a front vehicle body structure MK will be described with reference to FIGS. 9 and 10. FIG. 9 is a perspective view of a front section of a vehicle body M as seen diagonally from a left front upper side for explaining the front vehicle body structure MK. Some members are omitted to facilitate the understanding. FIG. 10 is a bottom view of the front section of the vehicle body M for explaining the front vehicle body structure MK.

A pair of front side members 101L, 101R are provided on the opposite sides of the front section of the vehicle body M in the vehicle width direction, the pair of front side members 101L, 101R being provided along the vehicle-body front-rear direction. Hereinafter, the pair of left and right front side members will also be referred to simply together as the front side members 101.

The space between the pair of front side members 101L, 101R in the front section part of the vehicle body M is an engine compartment RM1. Inside the engine compartment RM1, a powertrain 102 is disposed and supported at the opposite sides in the width direction on the front side members 101L, 101R. The powertrain 102 includes an engine disposed on the right side of the vehicle body M and a transmission 102B disposed on the left side of the vehicle body M. Support positions 102SL, 102SR of the powertrain 102 on the front side members 101L, 101R are shown by dashed lines in FIG. 9 and by + symbols in FIG. 10.

A dash panel 103 is disposed behind the engine compartment RM1, and a cabin RM2 is provided behind the dash panel 103.

A suspension member 104 is provided below the front side members 101L, 101R. The suspension member 104 is formed in such a way as to couple a pair of left and right side sills 109L, 109R to each other and to surround the left, right, and rear sides of the powertrain 102. The suspension member 104 includes: a side extension member 104L provided on the left side of the vehicle body M along the vehicle-body front-rear direction; and a side extension member 104R provided on the right side of the vehicle body M along the vehicle-body front-rear direction. The suspension member 104 further includes a coupling part 104M coupling the rear end sides of the side extension members 104L, 104R to each other. The side extension member 104L is formed by: a base member 104La on the rear side; and an add-on member 104Lb coupled to the front end of the base member 104La through a coupling portion P1 and extending forward therefrom.

The front side members 101 and the side extension members 104L, 104R of the suspension member 104 form a side member assembly KG. The pair of left and right side extension members 104L, 104R are disposed to sandwich the powertrain 102 therebetween.

Front end portions of the side extension members 104L, 104R of the suspension member 104 and front end portions of the front side members 101L, 101R are coupled respectively by strut parts 105L, 105R extending in the vertical direction of the vehicle body M. The front end portions of the side extension members 104L, 104R of the suspension member 104 are coupled to each other by a lower support (cross member) 106 configured to support a radiator core not shown.

Load transmission members 107L, 107R are attached to the side extension members 104L, 104R of the suspension member 104 behind the portions thereof where the strut parts 105L, 105R are coupled. Hereinafter, the load transmission members 107L, 107R will also be referred to simply together as the load transmission member 107. Meanwhile, front wheels M1 and a front bumper M2 are also shown in FIG. 10.

The load transmission member 107L and the load transmission member 107R are formed substantially plane-symmetrical with each other. For this reason, the structure of the load transmission member 107L will be representatively described with reference to FIGS. 11 to 14.

Figure 11:
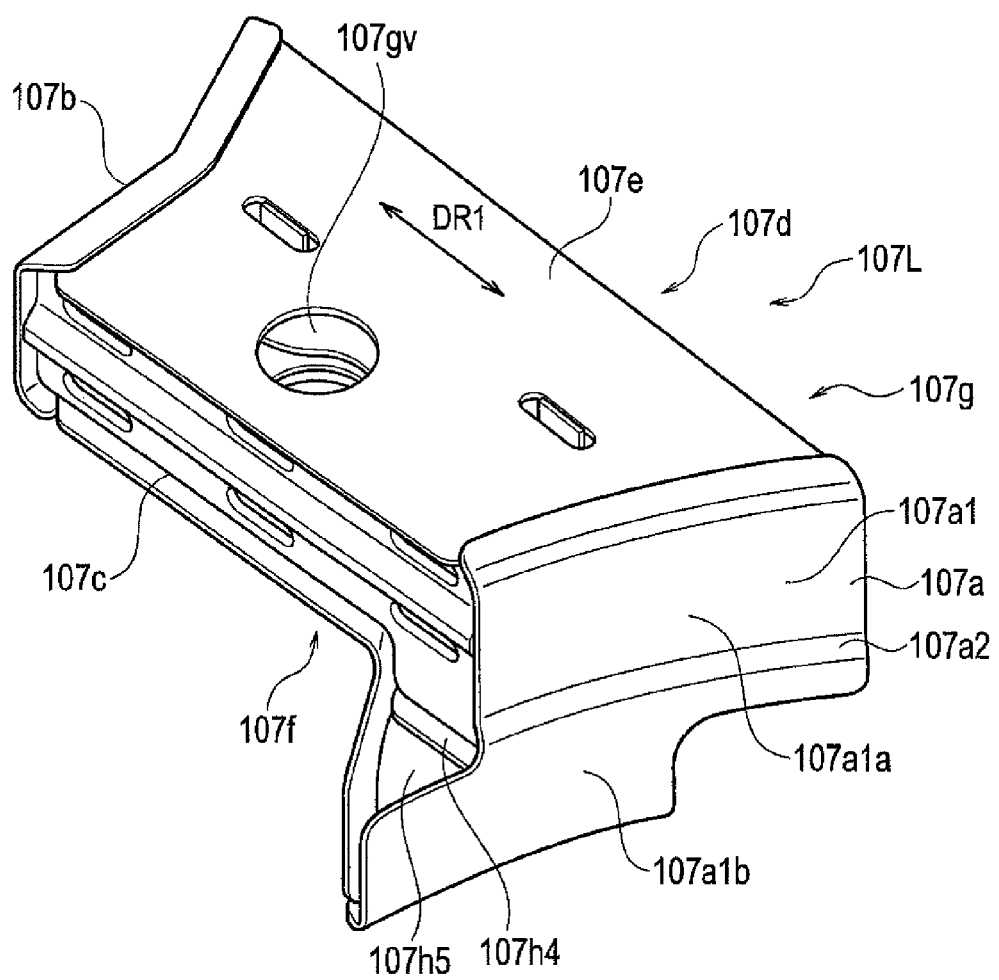
FIG. 11 is a perspective view for explaining one of load transmission members in the front vehicle body structure.
Figure 12:
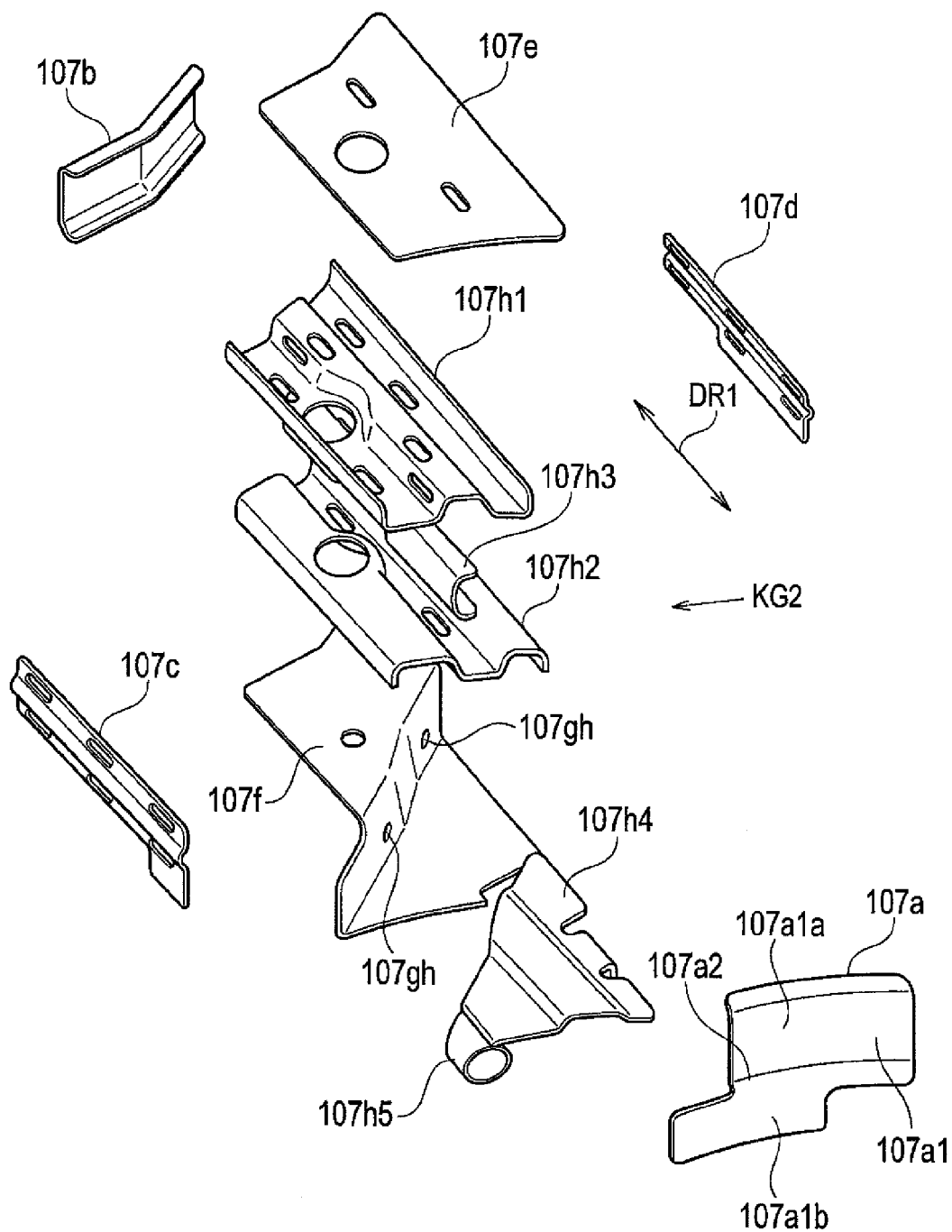
FIG. 12 is an exploded view for explaining the load transmission member.
Figure 13:
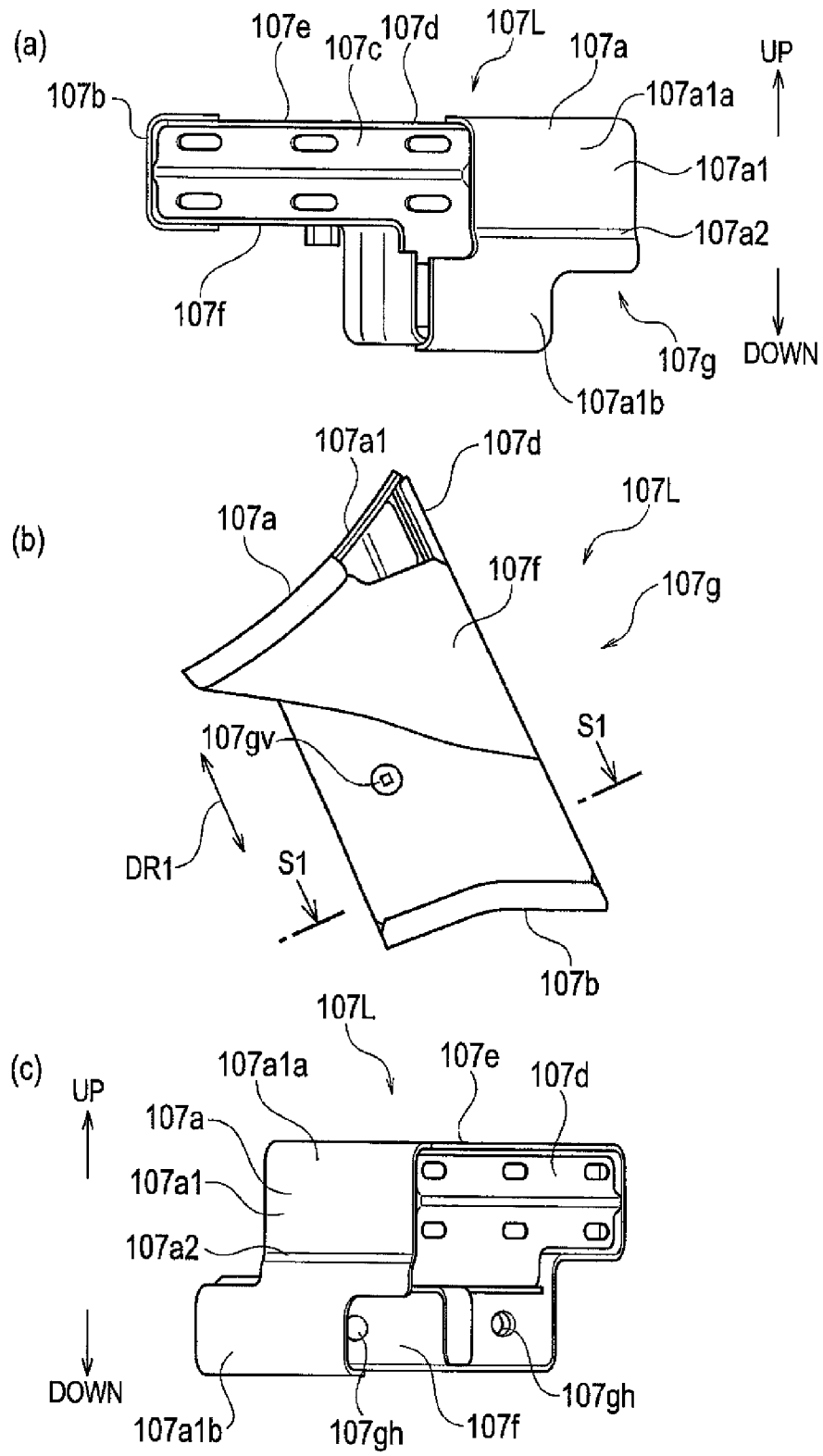
FIGS. 13(a)-13(c) are views at three different angles for explaining the load transmission member.
Figure 14:
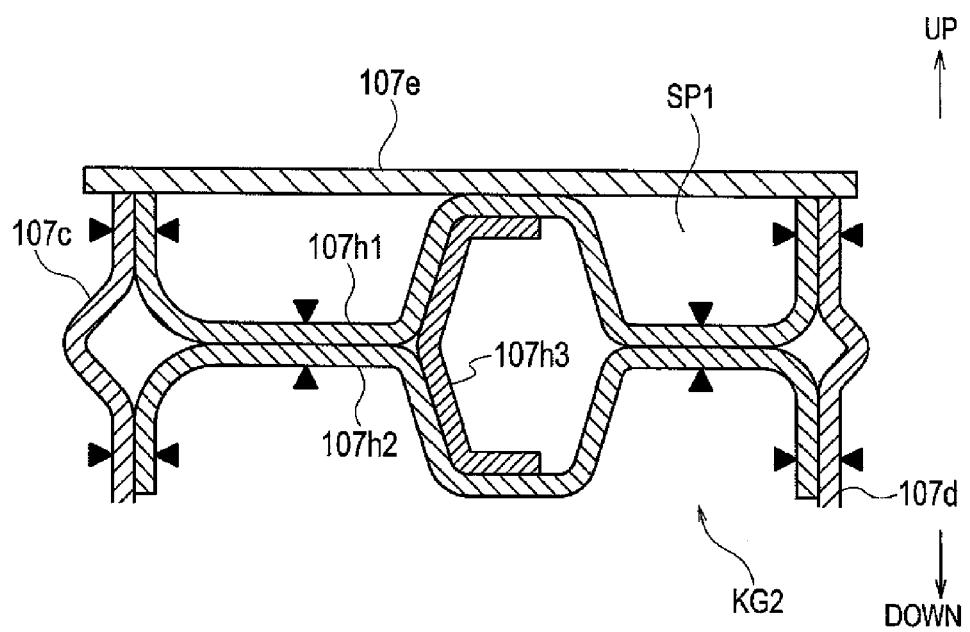
FIG. 14 is a cross-sectional view taken along line S1-S1 in FIG. 13.

FIG. 11 is a perspective view of the load transmission member 107L in substantially the same posture as that shown in FIG. 9. FIG. 12 is an exploded view of the load transmission member 107L. FIG. 13 is a set of views of the load transmission member 107L at three different angles. FIGS. 13(a), 13(b), and 13(c) are front, bottom, and right-side views, respectively, in the state of being attached to the side extension member 104L. FIG. 14 is a cross-sectional view taken along line S1-S1 in FIG. 13(b).

The load transmission member 107L includes, as exterior members, an outer side wall section 107a, an inner side wall section 107b, a front wall section 107c, a rear wall section 107d, a top plate section 107e, and a bottom wall section 107f. By assembling these members, a housing 107g is formed which has a space SP1 therein. The outer side wall section 107a has an outer surface 107a1 formed as a curved surface, in particular, a surface curved concavely in an arch shape in a plan view. Moreover, the outer surface 107a1 is formed to include an upper surface 107a1a (first surface) on the upper side of the vehicle body and a lower surface 107a1b (second surface) on the lower side of the vehicle body. At the center of the outer surface 107a1 in the vertical direction, a stepped portion 107a2 is provided such that the lower surface 107a1b protrudes to a position outward from the upper surface 107a1a and is formed with the same curvature as the upper surface 107a1a.

As shown in FIG. 12, the housing 107g houses therein an upper plate 107h1, a lower plate 107h2, a stay 107h3, a sub plate 107h4, and a pipe 107h5 as a structural part assembly KG2. Housing the structural part assembly KG2 can improve the stiffness of the load transmission member 107L. Note that in FIG. 14, positions at which welding is performed on the structural part assembly KG2 are shown with ▲ symbols. The welding can be arc welding or spot welding, for example.

The upper plate 107h1, the lower plate 107h2, the stay 107h3, and the sub plate 107h4 include protruding portions, bent portions, and the like along the direction in which the outer side wall section 107a and the inner side wall section 107b are connected (the direction of arrow DR1). The pipe 107h5 is formed with its axis aligned in the direction of arrow DR1. In this way, the load transmission member 107L is formed to have high stiffness in the direction of arrow DR1. Hereinafter, this direction in which the outer side wall section 107a and the inner side wall section 107b are connected will also be referred to as the load transmission direction DR1.

The housing 107g of the load transmission member 107L has bolt holes at three positions for fixing the load transmission member 107L to its counterpart with bolts. Specifically, there are a bolt hole 107gv (see FIG. 11 and FIG. 13(b)) for fixing in the vertical direction and bolt holes 107gv at two positions for fixing in the horizontal direction. The bolt holes 107gh are formed in the bottom wall section 107f. In the front vehicle body structure MK, the counterpart to which the load transmission member 107L is fixed through the bolt holes 107gv, 107gh at the three positions is the side extension member 104L of the suspension member 104.

Figure 15:
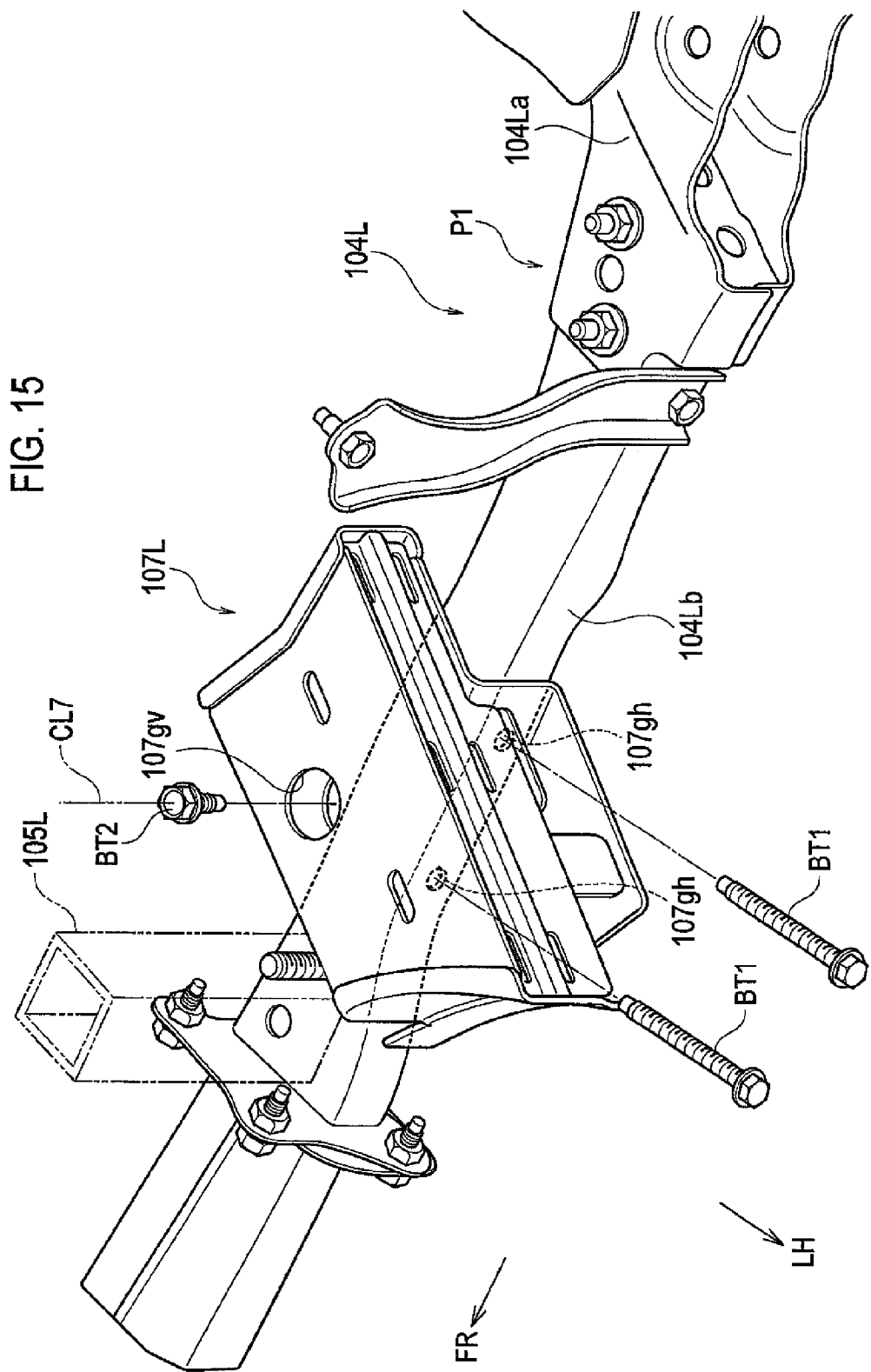
FIG. 15 is a perspective view for explaining a state where the load transmission member is attached to a side extension member.

The state where the load transmission member 107L is fixed to the side extension member 104L will now be described with reference to FIG. 15. The add-on member 104Lb of the side extension member 104L is formed in an angular tube shape having a substantially horizontal upper surface and a substantially vertical outer side surface (see FIG. 24). The load transmission member 107L is fixed to the add-on member 104Lb of the side extension member 104L with bolts BT1, BT2. Specifically, from the left side of the vehicle body M, two bolts BT1 are inserted into the bolt holes 107gh which are formed in the bottom wall section 107f and fastened to internally threaded portions not shown provided in the outer side surface of the add-on member 104Lb. Moreover, from the upper side, a bolt BT2 is inserted into the bolt hole 107gv and fastened to an internally threaded portion (not shown) provided in the upper surface of the add-on member 104Lb. Hereinafter, the axis of the bolt BT2 will also be referred to as the fixing axis CL7.

Thus, the load transmission member 107L is fastened with bolts in two axial directions, namely, the width direction and the vertical direction of the vehicle body M, and the bottom wall section 107f is fixed to both the upper surface and the outer side surface of the rectangular add-on member 104Lb. In this way, displacement and loosening are less likely to occur. Hence, the load transmission member 107L and the add-on member 104Lb are firmly fixed to each other as one member.

The load transmission member 107L fixed to the suspension member 104 has the following features in term of shape.

Figure 16:
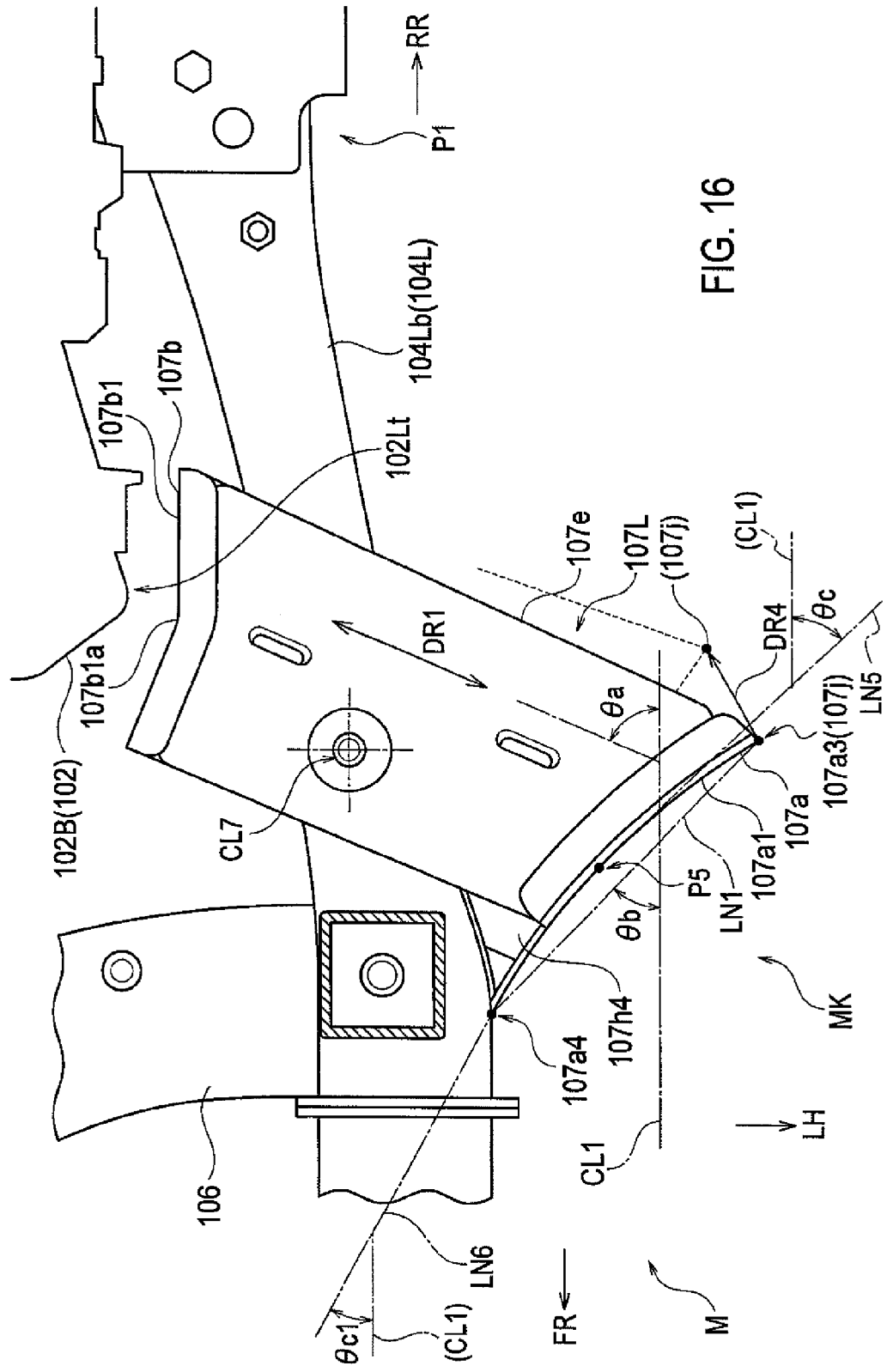
FIG. 16 is a top view for explaining the state where the load transmission member is attached to the side extension member.

FIG. 16 is a view of a left front section of the vehicle body M as seen from a position under the front side member 101L (see arrow Y1 in FIG. 9).

The load transmission member 107L is fixed to the add-on member 104Lb in such a posture as to project therefrom diagonally forward while extending toward the outer side of the vehicle body M, and diagonally rearward while extending toward the inner side of the vehicle body M. In other words, the housing 107g is attached in such a way as to straddle the add-on member 104Lb in the width direction. In such a state, an angle λa between the load transmission direction DR1 and an axis CL1 in the vehicle-body front-rear direction is 0°<θa<90°. The angle θa is approximately 65°, for example.

On the outer surface 107a1 of the outer side wall section 107a of the load transmission member 107L, a rear end 107a3 is an apex 107j which is the portion of the load transmission member 107L protruding furthest in the width direction. Also, a straight line in FIG. 16 connecting a tip 107a4 (first position) and the apex 107j (second position) will be referred to as the inclination line LN1, the tip 107a4 being a portion of the outer surface 107a1 where it joins the add-on member 104Lb. Here, an angle θb as the interior angle between the inclination line LN1 and the axis CL1 in the vehicle-body front-rear direction is equal to or smaller than 45°. Also, the outer surface 107a1 is a curved surface recessed inward from the inclination line LN1 in the width direction of the vehicle body M.

An outer surface 107b1 of the inner side wall section 107b of the load transmission member 107L protrudes to a position on the inner side of the vehicle body relative to the side extension member 104L, and faces a left front end portion (corner portion) 102Lt of the powertrain 102. Further, the outer surface 107b1 is formed to include a bent portion 107b1a where the outer surface 107b is recessed at the center. This bent portion 107b1a is formed in conformity with the shape of the left front end portion 102 Lt of the powertrain 102.

The structures and configurations of the load transmission member 107L and the add-on member 104Lb described above apply also to the load transmission member 107R and an add-on member 104Rb which are symmetrical therewith about the center axis of the vehicle body M.

Description will now be given of the transmission of a collision load and the behavior of each member in a small overlap collision at the left front section of the vehicle body M with reference to FIGS. 17 to 20(d). An obstacle ST that collides with the vehicle body M in the small overlap collision is shown, for example, in FIG. 10 in contact with the front bumper M2.

Figure 17:
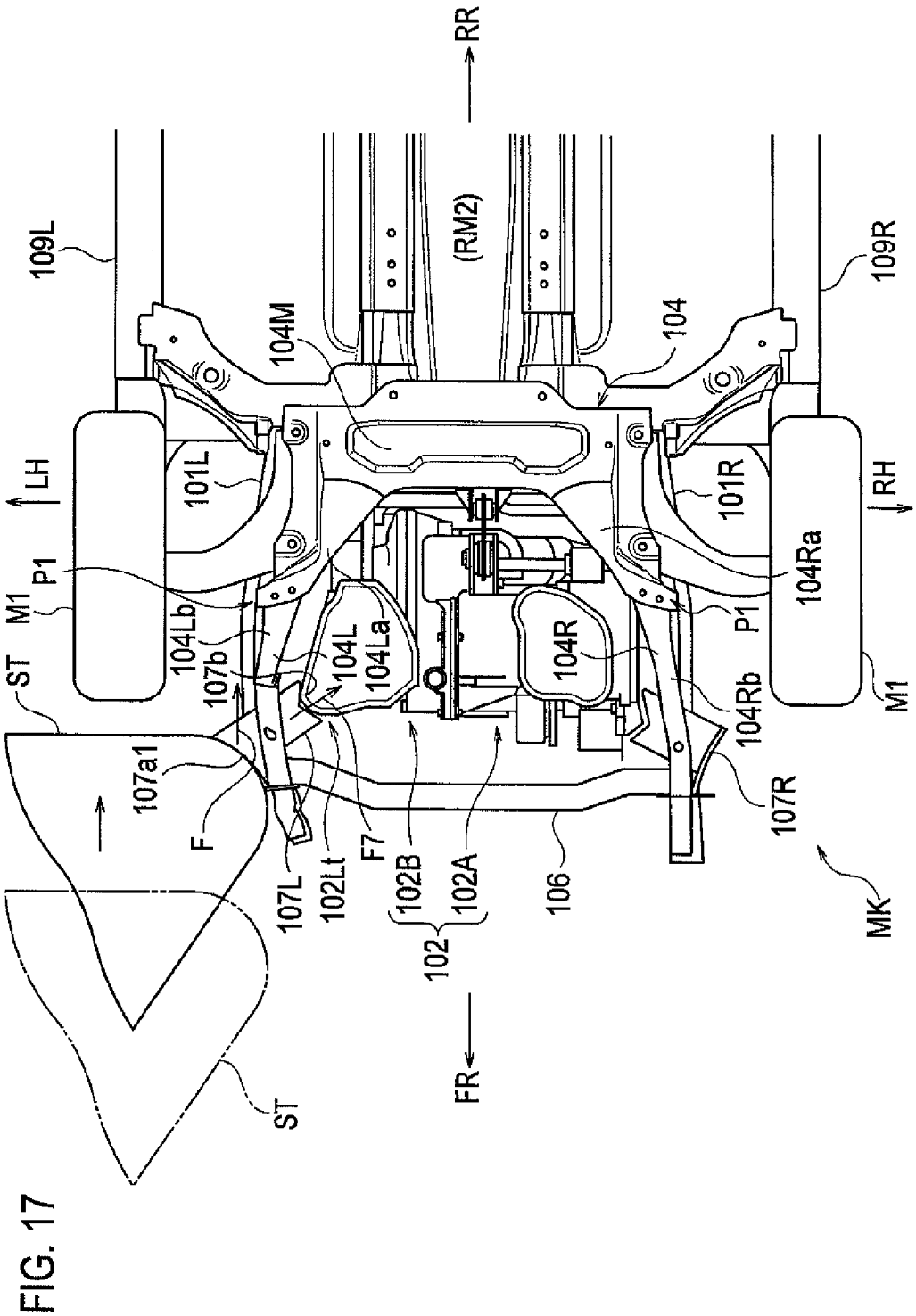
FIG. 17 is a bottom view for explaining the behavior of the front vehicle body structure undergoing a small overlap collision.
Figure 18:
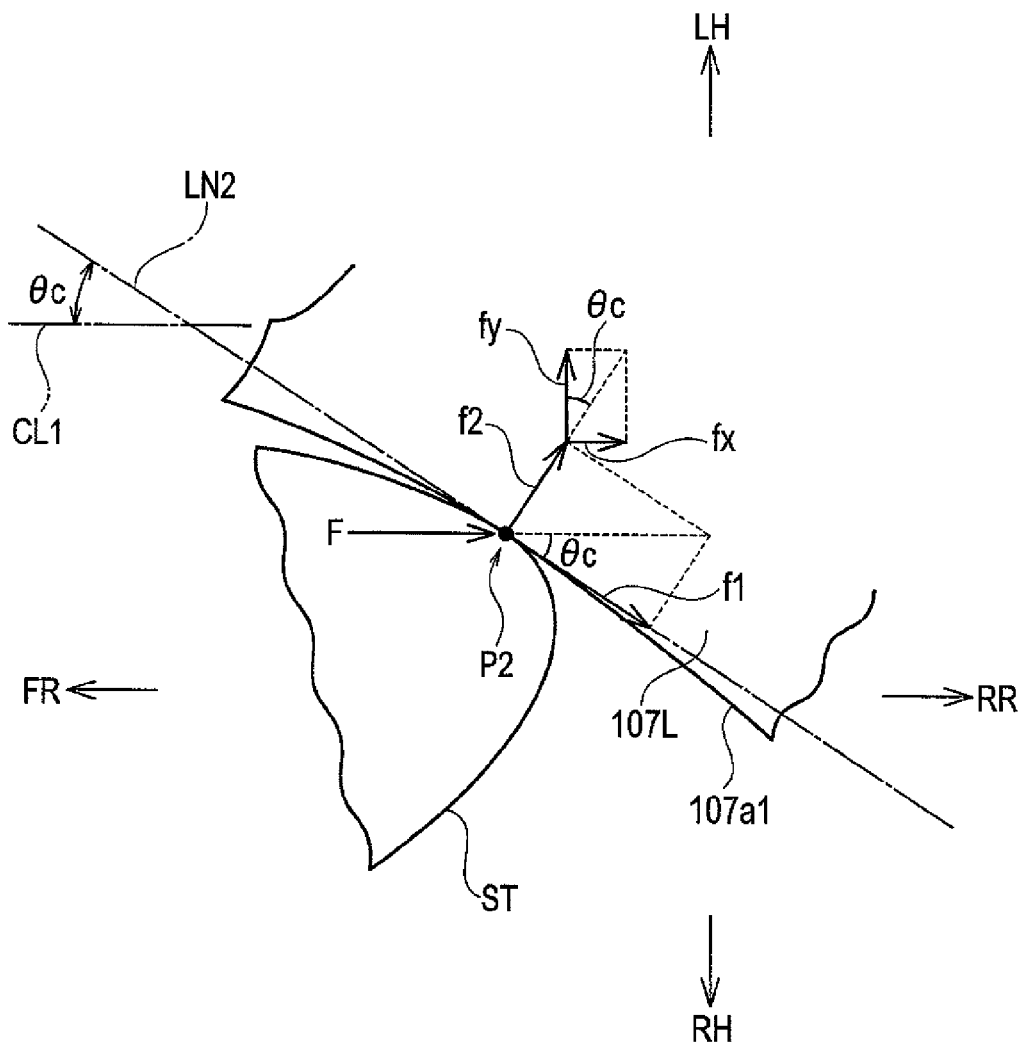
FIG. 18 is a schematic view for explaining a collision load applied to the load transmission member.

In FIG. 17, in relation to FIG. 10, a state where the vehicle body M undergoes a small overlap collision with the obstacle ST as a result of moving toward the left is shown as relative movement of the obstacle ST. In FIG. 17, the front bumper M2 is not shown. FIG. 17 shows a state where the obstacle ST has deformed the front end portion of the front side member 101L and the front end portion of the side extension member 104L of the suspension member 104 and collided with the outer surface 107a1 of the load transmission member 107L. FIG. 18 is a schematic view for explaining a collision load F resulting from the collision of the obstacle ST with the outer surface 107a1.

Figure 19:
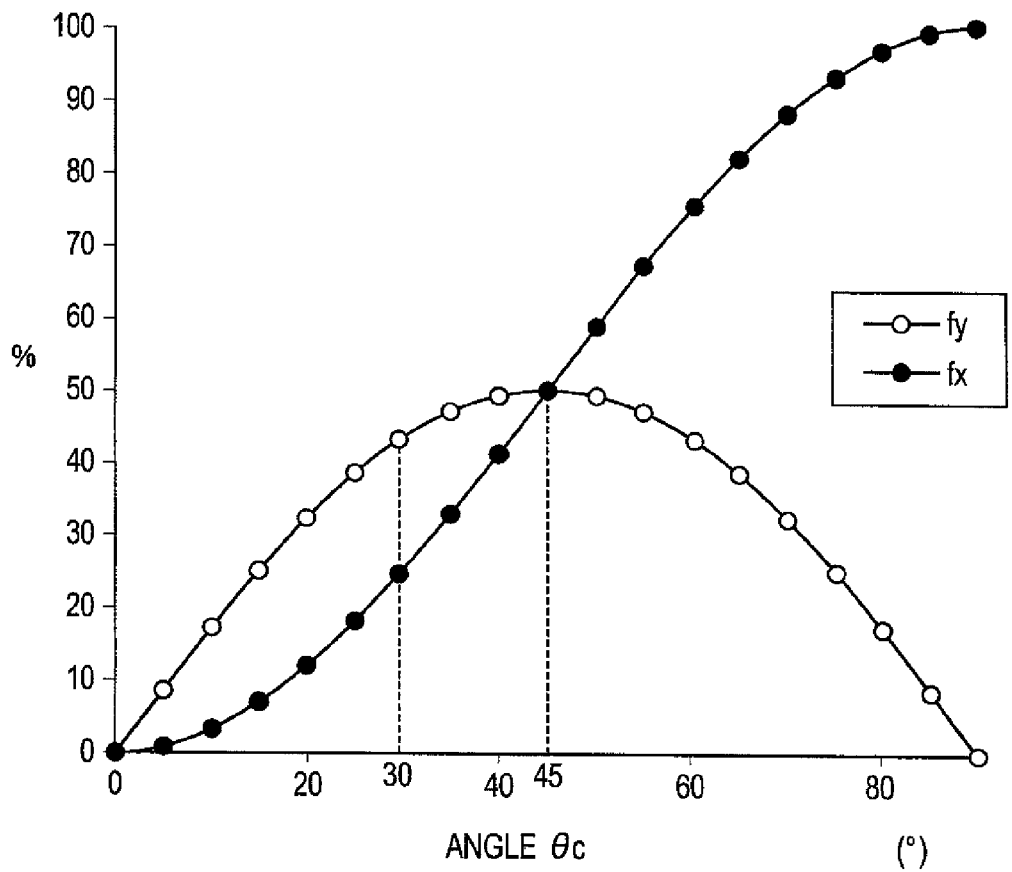
FIG. 19 is a graph for explaining a component of a force of the collision load.
Figure 20:
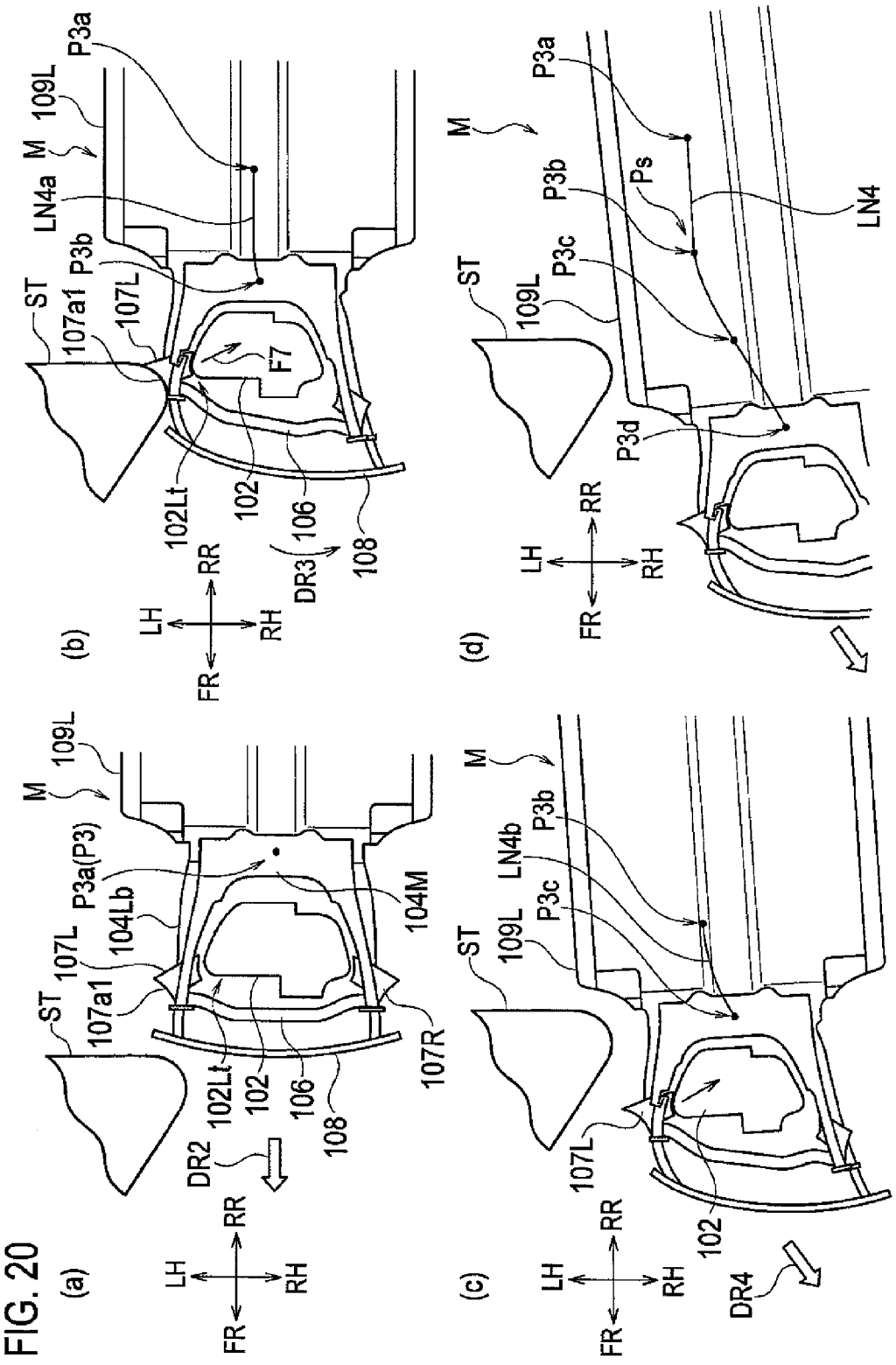
FIGS. 20(a)-20(d) are bottom views for explaining the behavior of the vehicle body undergoing the small overlap collision.

FIG. 19 is a graph for explaining the relationship between an axial force fx and a lateral force fy derived from the collision load F, and the angle of inclination of the collided portion. First, the component of the force of the collision load F will be described with reference to FIGS. 18 and 19.

The outer surface 107a1 is inclined to be separated outwardly further away from the vehicle body M as extending from the front side to the rear side of the vehicle body M. For this reason, as shown in FIG. 18, assuming that the obstacle ST collides with the outer surface 107a1 at a collision point P2, the collision load F applied to the load transmission member 107L is divided into a component f1 along a tangential line LN2 at the collided portion and a component f2 perpendicular to the tangential line LN2. Further, the component f2 is divided into the axial force fx in parallel with the axis CL1 in the front-rear direction and the lateral force fy perpendicular to the axis CL1. Here, the tangential line LN2 is assumed to be inclined at an angle θc with respect to the axis CL1 in the front-rear direction.

Each force is described as follows.

$$f2 = F \cdot \sin \theta c$$

$$fx = f2 \cdot \sin \theta c = (F \cdot \sin \theta c) \cdot \sin \theta c$$

$$fy = f2 \cdot \cos \theta c = (F \cdot \sin \theta c) \cdot \cos \theta c$$

The relationship in magnitude between the axial force fx and the lateral force fy is dependent on the angle θc and is shown in FIG. 19. In FIG. 19, the horizontal axis shows the angle θc (0° to 90°) while the vertical axis shows the percentage of each force such that the axial force fx is 100% when the angle θc is 90°, i.e. when the collided surface is perpendicular to the direction of the collision. As is clear from the graph, the axial force fx and the lateral force fy match each other when the angle θc is 45°. Further, the axial force fx is greater than the lateral force fy when the angle θc is within a range of from above 45° to 90°. Furthermore, the lateral force fy is greater than the axial force fx when the angle θc is within a range of from above 0° to below 45°.

The collision of the obstacle ST with the load transmission member 107L in the small overlap collision will be described under assumption of the points mentioned above. The obstacle ST collides with the outer surface 107a1, which is inclined with respect to the direction of the collision load F to be located further outward as extending rearward. The load transmission member 107L has relatively high stiffness since it is provided with the structural part assembly KG2. It is therefore mainly the add-on member 104Lb that is greatly deformed, and the load transmission member 107L is moved toward a rear inner side. By this movement toward the rear inner side, the inner side wall section 107b of the load transmission member 107L comes into contact with the left front end portion 102 Lt of the powertrain 102.

Having high rigidity particularly in the load transmission direction DR1, the load transmission member 107L is deformed only slightly even when colliding with the powertrain 102. For this reason, as shown in FIG. 17, the collision load is transmitted efficiently to the powertrain 102 as a force toward a right rear side (moving force F7).

The powertrain 102 is large in mass and therefore large in inertia force. Moreover, the moving force F7, which originates from the collision of the obstacle ST, is large enough to change the moving direction of the vehicle body M along with the powertrain 102. That is, upon receipt of the moving force F7 applied from the load transmission member 107L to the left front end portion 102 Lt, the powertrain 102 moves toward the right side of the vehicle body M. Due to this movement, the vehicle body M changes its direction in such a way as to move away from the obstacle ST toward the right side.

With the front vehicle body structure MK, the collision load applied to the load transmission member 107L in the small overlap collision is transmitted to the powertrain 102 at high efficiency. Such load transmission changes the moving direction of the powertrain 102, which is large in mass, and also changes the moving direction of the vehicle body M.

As described above, in the front vehicle body structure MK, the load transmission member 107L is attached to the side extension member 104L of the suspension member 104. The load transmission member 107L includes the outer side wall section 107a which protrudes outward further in the width direction as extending toward the rear side of the vehicle body, and the inner side wall section 107b which projects from the side extension member 104L to a position inward from the side extension member 104L in the width direction and near the powertrain 102. Then, when a collision load toward the rear side of the vehicle body M is applied to the outer side wall section 107a, the side extension member 104L is deformed and the inner side wall section 107b comes into contact with the powertrain 102. As a result, the collision load applied to the outer side wall section 107a is transmitted at high efficiency to the powertrain 102, which is in contact with the inner side wall section 107b, through the load transmission member 107L. In this way, the performance of absorbing the collision energy applied by collision from the front side of the vehicle body is further improved.

Moreover, the front vehicle body structure MK consumes the collision energy not only by deforming the suspension member 104 but also by changing the moving directions of the powertrain 102 and the vehicle body M. That is, the collision energy can be absorbed by also converting it into an energy that moves the vehicle body M away from the obstacle ST. Thus, the front vehicle body structure MK can achieve improved performance of absorbing the collision energy applied by collision from the front side of the vehicle body.

The course of change in the direction of the vehicle body M by the application of the moving force F7 to the powertrain 102 is shown in FIGS. 20(a)-20(d). FIGS. 20(a)-20(d) are schematic views of the vehicle body M as seen from below and shows changes in state in the small overlap collision with the obstacle ST. Note that in FIGS. 20(a)-20(d), a bumper reinforcement 108 is illustrated which couples the tips of the front side members 101L, 101R to each other. Also, in order to describe the trajectory of the vehicle body M, a center portion of the coupling part 104M of the suspension member in the width direction is set as a reference point P3 for convenience. Note that the center portion is a portion that deforms to a relatively small extent in the collision with the obstacle ST.

FIG. 20(a) shows a state immediately before the small overlap collision with the obstacle ST, and the vehicle body M is traveling forward in the direction of arrow DR2. FIG. 20(b) shows a state immediate after the small overlap collision with the obstacle ST. In this state, the bumper reinforcement 108 and the lower support 106 are deformed toward the right side (see arrow DR3) and the add-on member 104Lb is crushed. By the crush of the add-on member 104Lb and the collision of the obstacle ST with the outer surface 107a1, the load transmission member 107L is moved toward the right rear side and collides with the left front end portion 102Lt of the powertrain 102. This collision applies the moving force F7 to the powertrain 102. The reference point P3 moves from a position P3a to a position P3b. The trajectory of that movement is shown as a trajectory LN4a.

Since FIG. 20(b) shows the state immediately after the collision, the trajectory LN4a shifts slightly to the right side near the position P3b but is mostly straight. Due to the application of the moving force F7, the traveling direction of the powertrain 102 shifts to a diagonally right forward direction. This directional shift of the powertrain 102 changes the posture of the vehicle body M such that its front section is swung toward the right side along with the powertrain 102.

FIG. 20(c) shows a state after the collision where the load transmission member 107L is moved away from the obstacle ST. In this state, the moving direction of the vehicle body M shifts toward the diagonally right forward direction with the front side swung toward the right side. For this reason, a trajectory LN4b of the reference point P3 from the position P3b to a position P3c in the above state is inclined greatly toward a right front side.

FIG. 20(d) shows a state after a certain period of time has further elapsed. With the powertrain 102 swung greatly toward the right side by the moving force F7, collision between the obstacle ST and the side sill 109L is avoided. This eliminates direct influences such as entrance of the obstacle ST into the cabin RM2. Hence, the deformation of the cabin RM2 is reduced.

A trajectory LN4 clarifies the movement of the vehicle body M. Specifically, the trajectory LN4 of the reference point P3 from the position P3a to a position P3d is straight from the position P3a to a position Ps at which the collision occurs, and abruptly changes its direction toward the right front side after the collision. Thus, the trajectory LN4 passes a position far from the obstacle ST. Hence, the influence of the collision on the vehicle body M is reduced.

Here, behavior during the short period of time in which the obstacle ST and the load transmission member 107L come into contact with each other due to the collision will be described with reference to FIGS. 16 and 19, for example. As mentioned above, the outer surface 107a1 of the load transmission member 107L is recessed inward from the inclination line LN1 in the width direction of the vehicle body M.

First of all, the outer surface 107a1 is formed as a curved surface which is inclined and recessed from the outer side, and therefore has a shape in conformity with the outer shape of the obstacle ST as compared to a case where the outer surface 107a1 is a simple flat surface. This curved surface allows a larger area of contact between the obstacle ST and the outer surface 107a1 and accordingly reduces the stress in the outer surface 107a1 and its periphery caused by the collision load F. As result, local deformation of the load transmission member 107L is reduced, and the collision load F therefore attenuates only slightly at the load transmission member 107L. The collision load F is then transmitted from the outer surface 107a1 of the outer side wall section 107a to the outer surface 107b1 of the inner side wall section 107b. Hence, the collision load F can be transmitted more efficiently to the powertrain 102.

Also, the time of contact between the obstacle ST and the outer surface 107a1 is longer. As a result, the time for the load transmission member 107L to transmit the collision load F to the powertrain 102 is longer. Hence, the collision load F can be transmitted more efficiently to the powertrain 102.

The behavior will be described in more detail. In the following description, to facilitate the understanding, the obstacle ST is assumed to come into point contact in the collision in FIG. 16. Moreover, for convenience, the angle θc of a tangential line LN5 at a contact point P5 is assumed as the collision angle.

In this case, as shown in FIG. 16, since the outer surface 107a1 is a concave curved surface, the contact point P5 for the obstacle ST is the tip 107a4 at the beginning of the collision. The collision angle at this tip 107a4 is an angle θc1 between a tangential line LN6 at the tip 107a4 and the axis CL1 in the front-rear direction and is smaller than the angle θa. That is, the collision angle at the tip 107a4 represents a collision at a smaller angle than the angle θb between the inclination line LN1, which connects the tip 107a4 and the apex 107j, and the axis CL1 in the front-rear direction.

As described above, the front vehicle body structure MK is advantageously such that a portion of the outer side wall section 107a on the front side of the vehicle body is formed in a concave arched shape in a plan view. In this way, the obstacle ST collides with the outer side wall section 107a at a shallower angle. This reduces the generation of a force in the front-rear direction which the vehicle body M receives in the collision.

In the course of the collision, the contact point PS moves on the outer surface 107a1 from the tip 107a4 toward the apex 107j, and the angle θc, which is the collision angle, increases with this movement. If, for example, the add-on member 104Lb is not crushed or other members are not deformed by the collision, the angle θc becomes larger than the angle θb when the contact point P5 reaches the apex 107j.

On the other hand, the load transmission member 107L changes its posture due to crush or the like of, for example, the add-on member 104Lb by the collision such that the load transmission member 107L is pushed in. In this change, as shown by arrow DR4 in FIG. 16, the position of the apex 107j moves toward the center of the vehicle body M. Thus, the angle θb between the tangential line LN5 at the apex 107j after the movement and the axis CL1 in the front-rear direction is smaller than that before the collision.

In view of this, the initial position of the load transmission member 107L, the curvature of the outer surface 107b1 and the like are advantageously set such that the angle θb in the pushed-in posture after the collision is not larger than 45°. In other words, the collision angle θc at the contact point P5 is advantageously maintained to be not larger than 45° while the contact point P5 moves from the tip 107a4 to the apex 107j with the elapse of time in the collision.

According to FIG. 19, the lateral force fy is dominant over the axial force fx when the angle θc, which is the collision angle, is equal to or smaller than 45°. For this reason, the outer side wall section 107a is advantageously formed such that the interior angle between the inclination line LN1 and the axis CL1 in the front-rear direction of the vehicle body is equal to or smaller than 45°. Here, the inclination line LN1 is a straight line connecting the tip 107a4, as the first position at which the outer side wall section 107a joins the side extension member 104L, and the apex 107j, as the second position at which the outer side wall section 107a protrudes outwardly furthest in the vehicle width direction. In this way, the collision angle is such that the lateral force fy is always dominant at any point of time during the collision between the obstacle ST and the load transmission member 107L. Hence, the load transmission to the powertrain 102 through the load transmission member 107L is done more efficiently.

Figure 21:
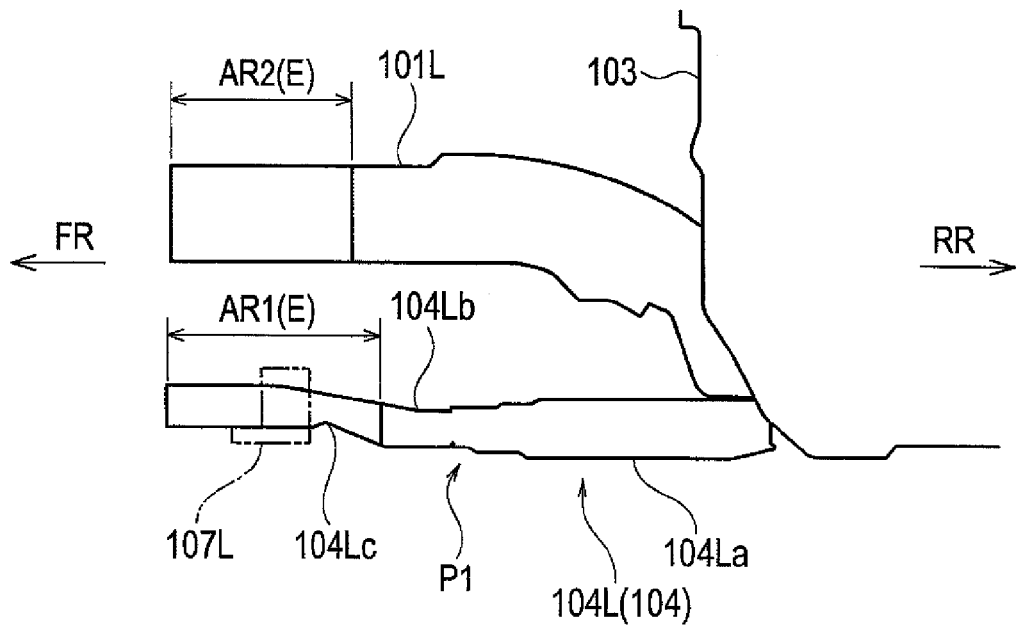
FIG. 21 is a side view showing a state before a collision for explaining the absorption of the collision energy by a suspension member in the front vehicle body structure.

The absorption of the collision energy by the suspension member 104 will now be described with reference to FIG. 21. FIG. 21 is a left-side view showing the side extension member 104L of the suspension member 104 and the front side member 101L along with the dash panel 103. In FIG. 21, an area AR1 on the front side of the side extension member 104L and an area AR2 on the front side of the front side member 101L are formed as sections that are mainly deformed in a frontal collision. In other words, the area AR1 and the area AR2 are energy absorption areas E.

In particular, the side extension member 104L is advantageously provided with an energy absorption portion 104Lc between the load transmission member 107L which is attached to the add-on member 104Lb and the coupling portion P1 through which the add-on member 104Lb is coupled to the base member 104La. The energy absorption portion 104Lc has a structure that is easily deformable by pressure.

Figure 22:
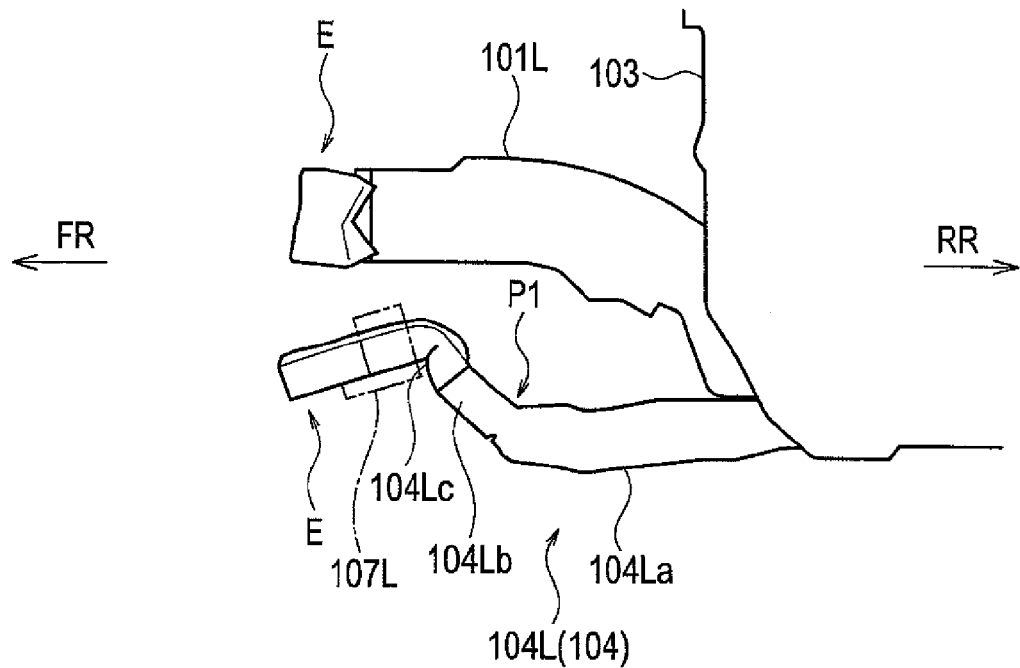
FIG. 22 is a side view showing a state after the collision in relation to FIG. 21.
Figure 23:
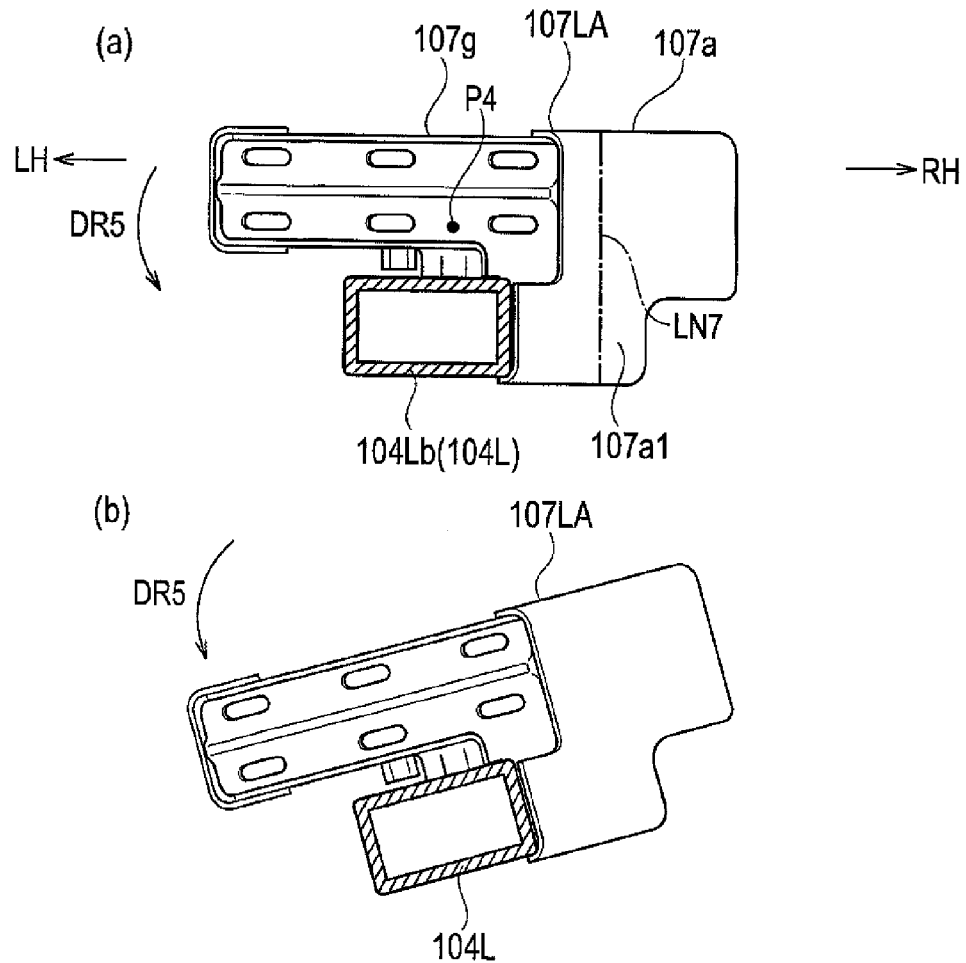
FIGS. 23(a)-23(b) are front views for explaining turning in a collision in a case where a load transmission member is used.

FIG. 22 is a view showing a state after a frontal collision in relation to FIG. 21. The front side member 101L is deformed mostly at the energy absorption area E to absorb the energy. The side extension member 104L is deformed greatly at the energy absorption portion 104Lc to absorb the energy, and the deformation of the rest of the energy absorption area E is small.

As described above, in the front vehicle body structure MK, the side extension member 104L is advantageously provided with the energy absorption portion 104Lc, which is deformable more easily than the rest of the side extension member 104L, at a portion of the side extension member 104L on the rear side of the vehicle body relative to the load transmission member. In this way, in a frontal collision, the side extension member 104L is deformed mainly at the energy absorption portion, which allows the side extension member 104L to be deformed in a predetermined manner. As a result, the posture of the load transmission member 107L in which it comes into contact with the powertrain 102 is stabilized, and the collision load is therefore transmitted more reliably to the powertrain 102. Hence, the performance of absorbing the collision energy applied by collision from the front side of the vehicle body is maintained at a light level.

The load transmission member 107L may be a load transmission member 107LA without the stepped portion 107a2 on the outer surface 107a1. The load transmission member 107LA, however, has a possibility of being turned about the longitudinal axis of the side extension member 104L, i.e. about the axis CL1 in the front-rear direction when the side extension member 104L is deformed in a small overlap collision.

FIG. 23(a) is a front view of the load transmission member 107LA for explaining a state where this turn occurs. As shown in FIG. 23(a), in the load transmission member 107LA, the outer surface 107a1 of the outer side wall section 107a is an even curved surface with no step.

Most part of the housing 107g of the load transmission member 107LA is disposed above the side extension member 104L. In FIG. 23(a), an upper left section of the housing 107g relative to a center P4 projects greatly. Then, when the obstacle ST collides with an entire vertical region on the outer surface 107a1 (a region shown by a dashed line LN7 in FIG. 23(a)) at once, a counterclockwise turning force is generated. Thus, the energy absorption portion 104Lc is crushed and, at the same time, its posture is turned counterclockwise (see arrow DR5). As a result, the tip side of the side extension member 104L relative to the energy absorption portion 104Lc appears tilted toward the left side along with the load transmission member 107LA, as shown in FIG. 23(b). In this way, the efficiency of load transmission to the powertrain 102 may possibly be lower than that with the load transmission member 107L.

Figure 24:
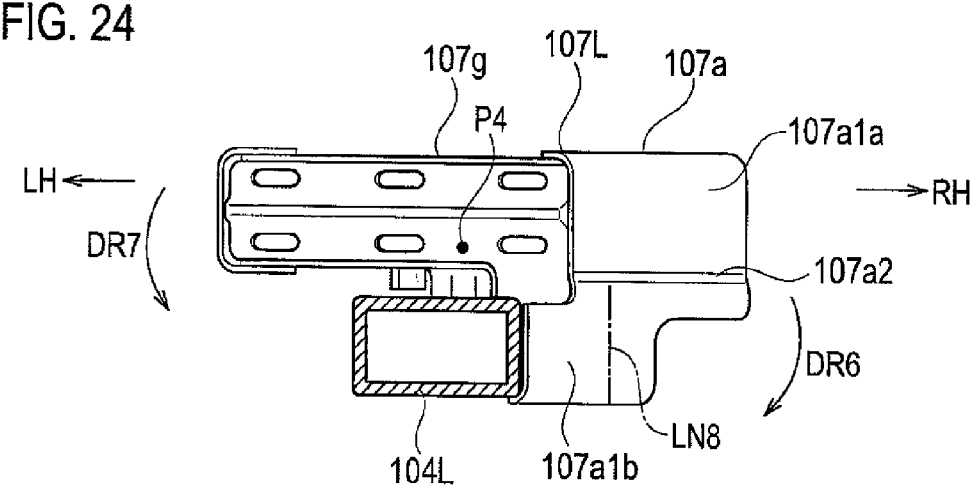
FIG. 24 is a front view for explaining turning in a collision in a case where the load transmission member is used.

On the other hand, the load transmission member 107L includes the stepped portion 107a2 on the outer surface 107a1 of the outer side wall section 107a. Moreover, as shown in FIG. 24, the outer surface below the position of the center P4 is the lower surface 107a1b, and this lower surface 107a1b protrudes outward from the upper surface 107a1a above the position of the center P4. Then, when the obstacle ST collides with the outer surface 107a1, it firstly collides with only the lower surface 107a1b (a region shown by a dashed line LN8 in FIG. 24) and then collides with the upper surface 107a1a after the elapse of a certain period of time.

In the collision with the lower surface 107a1b, the obstacle ST collides at a position below the center P4, so that a clockwise turning force is generated (arrow DR6). On the other hand, in the collision with the upper surface 107a1a, a counterclockwise turning force is generated (arrow DR5).

As described above, in the front vehicle body structure MK, the side extension member 104L is formed in an angular tube shape. Moreover, the load transmission member 107L is fixed to the upper surface and the outer side surface, in the vehicle width direction, of the side extension member 104L. Further, the outer side wall section 107a and the inner side wall section 107b are coupled to each other in such a way as to straddle the upper side of the side extension member 104L.

Moreover, the outer side wall section 107a has the upper surface 107a1a which is the first surface on the upper side and the lower surface 107a1b which is the second surface on the lower side. Further, the second surface (lower surface 107a1b) is advantageously formed to protrude outward from the first surface (upper surface 107a1a) in the vehicle width direction. In this way, the clockwise turning force generated by the obstacle ST colliding firstly with the lower surface 107a1b is cancelled out by the counterclockwise turning force generated by the obstacle ST colliding thereafter with the upper surface 107a1a. The side extension member 104L therefore hardly turns when the energy absorption portion 104Lc is crushed. Thus, the load transmission member 107L comes into contact with the powertrain 102 with substantially no turning. Hence, the load transmission member 107L can transmit the collision load at high efficiency to the powertrain 102.

Figure 25:
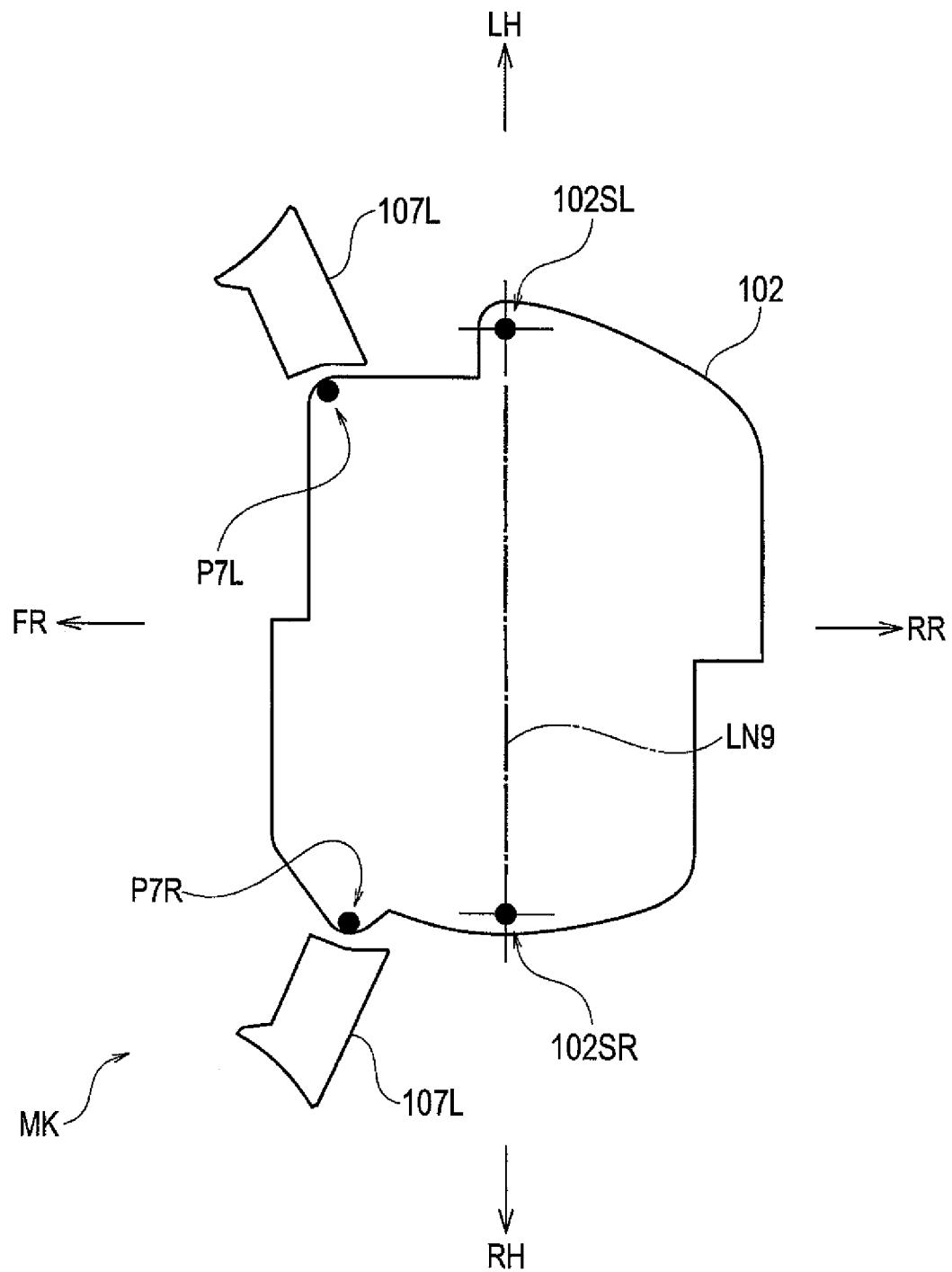
FIG. 25 is a schematic view of a powertrain and each load transmission member as seen from below.

FIG. 25 is a schematic view of the powertrain 102 and the load transmission members 107L, 107R as seen from the lower side of the vehicle body M. The following assumes that either of the load transmission members 107L, 107R comes into contact at its inner side wall section 107b with the powertrain 102 at a position P7L, P7R (contact position P7L, P7R) in a small overlap collision with the obstacle ST. An imaginary straight line connecting a support position 102SL and a support position 102SR at which the powertrain 102 is supported on the front side members 101L, 101R will be referred to as the coupling line LN9.

Suppose that the positions P7L, P7R are located rearward of the coupling line LN9. In this case, when a moving force F7 is transmitted to the powertrain 102, the rear side of the powertrain 102 changes its direction to the direction of the moving force F7. For this reason, the vehicle body M traveling forward changes its direction to the direction opposite to the direction of the transmitted moving force F7. As a result, the vehicle body M moves toward the obstacle ST and is therefore more greatly influenced by the obstacle ST.

On the other hand, in the front vehicle body structure MK, these positions P7L, P7R are set forward of the coupling line LN9. For this reason, when the load transmission member 107L, 107R transmits a moving force F7 to the powertrain 102 in a collision with the obstacle ST, the front side of the powertrain 102 changes its direction to the direction of the moving force F7. Thus, as shown in FIGS. 20(a)-20(d), the vehicle body M traveling forward moves while changing its direction to a direction corresponding to the transmitted moving force F7. Hence, the vehicle body M moves away from the obstacle ST. In this way, the influence of the obstacle ST on the vehicle body M can be reduced.

As described above, the front vehicle body structure MK includes the pair of front side members 101L, 101R, which are provided along the front-rear direction in such a way as to sandwich the powertrain 102 from the opposite sides in the vehicle width direction. Moreover, the pair of front side members 101L, 101R support the powertrain 102 at the pair of support positions 102SL, 102SR on the opposite sides in the width direction thereof. Furthermore, the positions P7L, P7R, at which the inner side wall sections 107b come into contact with the powertrain 102, are advantageously located on the front side of the vehicle body relative to the coupling line LN9, which passes the support positions 102SL, 102SR. In this way, when the load transmission member 107L, 107R transmits a moving force F7 to the powertrain 102 in a collision with the obstacle ST, the front side of the powertrain 102 changes its direction to the direction of the moving force F7. Then, the vehicle body M traveling forward moves while changing its direction to a direction corresponding to the transmitted moving force F7. In other words, the vehicle body M moves away from the obstacle ST. Hence, the influence of the collision of the obstacle ST on the vehicle body M can be reduced.

In the front vehicle body structure MK, the load transmission members 107L, 107R are provided not on the front side members 101L, 101R but on the side extension members 104L, 104R of the suspension member 104. In this way, the collision performance of the front side members 101L, 101R against frontal collision such as full-overlap collision is not lowered. Hence, the front vehicle body structure MK has achieved improved performance of absorbing the collision energy applied to the vehicle body in a collision from the front side.

As compared to the conventional reinforcement extension, the front vehicle body structure MK can reduce the amount of projection toward the outer side in the vehicle width direction and therefore has a high degree of freedom in design for exteriors that narrow on the front side of the vehicle body.

As described above, like the first embodiment, the front vehicle body structure according to the second embodiment also includes: a member which is provided at the side section of the vehicle body along the vehicle-body front-rear direction; and the powertrain 102 disposed on the inner side of the vehicle body relative to the member and fixed to the front section of the vehicle body. The front vehicle body structure further includes the load transmission member provided on the member and configured to come into contact with one end portion, in the vehicle width direction, of the powertrain when receiving a collision load applied by an obstacle from the front side of the vehicle body, and to transmit the load to the powertrain in a state of being sandwiched between the obstacle and the powertrain.

Further, in the second embodiment, the member is the suspension member 104 including the pair of left and right side extension members 104 provided along the vehicle-body front-rear direction in such a way as to sandwich the powertrain 102 from the opposite sides in the vehicle width direction. Also, the load transmission member 107 is attached to the side extension member 104. Moreover, the load transmission member includes: the outer side wall section 107a being formed to project outward further in the vehicle width direction from the side extension member as extending toward to the rear side of the vehicle body; and the inner side wall section 107b projecting from the side extension member to a position inward from the side extension member in the vehicle width direction and being disposed to face the powertrain. Further, the side extension member 104 is deformed to bring the inner side wall section 107b into contact with the powertrain 102 when the collision load is applied to the outer side wall section 107a of the load transmission member 107. As described above, the collision load is transmitted at high efficiency through the load transmission member to the powertrain which is in contact with the inner side wall section. Hence, the collision energy applied by a collision from the front side of the vehicle body can be absorbed efficiently.

The entire contents of Japanese Patent Application No. 2013-079151 (filed on Apr. 5, 2013) and Japanese Patent Application No. 2013-173402 (filed on Aug. 23, 2013) are incorporated herein.

The present invention has been described above through specific embodiments. However, it is apparent to those skilled in the art that the present invention is not limited the above description, and various changes and modifications can be made.

According to one or more embodiments of the present invention, when receiving a collision load from the front side of the vehicle, the load transmission member transmits the load from the obstacle to the powertrain while turning along with the powertrain in the state of being sandwiched between the obstacle and the powertrain. Thus, the collision load received by the load transmission member is efficiently transmitted to the vehicle body through the powertrain. Hence, enhanced performance of absorbing collision load from the front side of the vehicle body can be achieved.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1, M vehicle body
3, 3A obstacle
5, 101, 101L, 101R front side member
9, 9A, 107, 107L, 107R, 107LA load transmission member
11 cross member
23, 102 powertrain
102SL, 102SR support position
104 suspension member
104L, 104R side extension member
104Lc energy absorption portion
107a outer side wall section
107b inner side wall section
CL1 axis in vehicle-body front-rear direction
MK front vehicle body structure

The invention claimed is:

1. A front vehicle body structure comprising:
a member provided at a side section of a vehicle body along a vehicle-body front-rear direction;
a powertrain disposed on an inner side of the vehicle body relative to the member and fixed to a front section of the vehicle body; and
a load transmission member provided on the member and configured to come into contact with one end portion, in a vehicle width direction, of the powertrain when receiving a collision load applied by an obstacle from a front side of the vehicle body, and to transmit the load from the obstacle to the powertrain in a state of being sandwiched between the obstacle and the powertrain,
wherein the load transmission member has a concave curved surface formed in a surface thereof along the vehicle-body front-rear direction, and
wherein the concave curved surface is elastically deformed in the state of being sandwiched between the obstacle and the powertrain and receiving the load.

2. The front vehicle body structure according to claim 1, further comprising:
a cross member provided along the vehicle width direction,
wherein the member is a pair of left and right side members provided at the respective side sections of the vehicle body along the vehicle-body front-rear direction,
wherein the cross member couples the pair of left and right side members to each other, and
wherein the load transmission member is provided between each of the side members and the cross member and transmits the collision load to the powertrain while turning along with the powertrain in the state of being sandwiched between the obstacle and the powertrain.

3. The front vehicle body structure according to claim 1, wherein a contact portion of the load transmission member on the front side of the vehicle body which comes into contact with the obstacle is located outside, in the vehicle width direction, from a contact portion of the load transmission member on a rear side of the vehicle body which comes into contact with the powertrain.

4. The front vehicle body structure according to claim 1, wherein a shape of a contact portion of the load transmission member which comes into contact with the powertrain is in conformity with a shape of the powertrain.

5. A front vehicle body structure comprising:
a member provided at a side section of a vehicle body along a vehicle-body front-rear direction;
a powertrain disposed on an inner side of the vehicle body relative to the member and fixed to a front section of the vehicle body; and
a load transmission member provided on the member and configured to come into contact with one end portion, in a vehicle width direction, of the powertrain when receiving a collision load applied by an obstacle from a front side of the vehicle body, and to transmit the load from the obstacle to the powertrain in a state of being sandwiched between the obstacle and the powertrain,
wherein the member is a suspension member including a pair of left and right side extension members provided along the vehicle-body front-rear direction in such a way as to sandwich the powertrain from opposite sides in the vehicle width direction,
wherein the load transmission member is attached to the side extension members,
wherein the load transmission member includes an outer side wall section and an inner side wall section,
wherein the outer side wall section is formed to project outward further in the vehicle width direction from the side extension member as extending toward a rear side of the vehicle body,
wherein the inner side wall section projects from the side extension member to a position inward from the side extension member in the vehicle width direction and being disposed to face the powertrain, and
wherein the side extension member is deformed to bring the inner side wall section into contact with the powertrain when the collision load is applied to the outer side wall section of the load transmission member.

6. The front vehicle body structure according to claim 5, wherein each of the side extension members includes an energy absorption portion on the rear side of the vehicle body relative to the load transmission member, and
wherein the energy absorption portion is deformable more easily than a rest of the side extension member.

7. The front vehicle body structure according to claim 5, wherein a portion of the outer side wall section on the front side of the vehicle body is formed in a concave arched shape.

8. The front vehicle body structure according to claim 5,
wherein the outer side wall section is formed such that an interior angle between a straight line connecting a first position and a second position and an axis in the vehicle-body front-rear direction is equal to or smaller than 45°,
wherein the first position is a position at which the outer side wall section joins the side extension member, and
wherein the second position is a position at which the outer side wall section protrudes outwardly furthest in the vehicle width direction.

9. The front vehicle body structure according to claim 5,
wherein each of the side extension members is formed in an angular tube shape,
wherein the load transmission member is fixed to an upper surface and an outer side surface in the vehicle width direction of the side extension member and is formed by coupling the outer side wall section and the inner side wall section to each other in such a way to straddle a portion of the side extension member on an upper side of the vehicle body,
wherein the outer side wall section has a first surface on the upper side of the vehicle body and a second surface on a lower side of the vehicle body, and
wherein the second surface protrudes outward from the first surface in the vehicle width direction.

10. The front vehicle body structure according to claim 5, further comprising:
a pair of side members provided along the vehicle-body front-rear direction in such a way as to sandwich the powertrain from opposite sides in the vehicle width direction,
wherein the pair of side members support the powertrain at a pair of support positions on opposite sides in a width direction thereof, and
wherein a position at which the inner side wall section of the load transmission member comes into contact with the powertrain is on the front side of the vehicle body relative to an imaginary straight line passing the pair of support positions.

\* \* \* \* \*